(12) United States Patent
Yerramalli et al.

(10) Patent No.: US 12,171,021 B2
(45) Date of Patent: Dec. 17, 2024

(54) HIERARCHICAL SENSING IN A WIRELESS COMMUNICATIONS SYSTEM

(71) Applicant: QUALCOMM Incorporated, San Diego, CA (US)

(72) Inventors: Srinivas Yerramalli, Hyderabad (IN); Arumugam Chendamarai Kannan, San Diego, CA (US); Vinay Chande, San Diego, CA (US); Tao Luo, San Diego, CA (US); Xiaoxia Zhang, San Diego, CA (US); Jing Sun, San Diego, CA (US); Sungwoo Park, Seoul (KR); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 897 days.

(21) Appl. No.: 17/249,611

(22) Filed: Mar. 5, 2021

(65) Prior Publication Data
US 2021/0307063 A1 Sep. 30, 2021

Related U.S. Application Data

(60) Provisional application No. 63/001,060, filed on Mar. 27, 2020.

(51) Int. Cl.
*H04W 74/0808* (2024.01)
*H04W 72/044* (2023.01)
*H04W 72/0453* (2023.01)

(52) U.S. Cl.
CPC ... *H04W 74/0808* (2013.01); *H04W 72/0453* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 2019/0349969 A1* | 11/2019 | Chakraborty | H04W 74/0808 |
| 2020/0059961 A1* | 2/2020 | Do | H04W 74/0808 |
| 2021/0007141 A1* | 1/2021 | Chen | H04B 7/0617 |

(Continued)

OTHER PUBLICATIONS

Vivo, 3GPP TSG RAN WG1 Meeting #92, "Potential solutions and techniques for NR unlicensed spectrum", R1-1801557, Feb. 2018, all pages. (Year: 2018).*

*Primary Examiner* — Srinivasa R Reddivalam
(74) *Attorney, Agent, or Firm* — QUALCOMM Incorporated

(57) ABSTRACT

Wireless communications systems and methods related to communications in a network are provided. A first wireless communication device may perform in a shared radio frequency band during a first portion of a frame period, a first listen-before-talk (LBT) using a first beam characteristic. Additionally, the first wireless communication device may perform in the shared radio frequency band during a second portion of the frame period, a second LBT using a second set of beam characteristics different from the first beam characteristic. The first wireless communication device may communicate with a second wireless communication device in the shared radio frequency band during the second portion of the frame period, one or more communication signals using the second set of beam characteristics. Other aspects and features are also described.

24 Claims, 8 Drawing Sheets

(56) References Cited

U.S. PATENT DOCUMENTS

| | | | |
|---|---|---|---|
| 2021/0185547 A1* | 6/2021 | Zhao | H04B 7/0617 |
| 2021/0259014 A1* | 8/2021 | Falahati | H04W 72/1268 |
| 2023/0126503 A1* | 4/2023 | Ökvist | H04W 76/14 |
| | | | 375/267 |

* cited by examiner

HIERARCHICAL SENSING IN A WIRELESS COMMUNICATIONS SYSTEM

CROSS REFERENCE TO RELATED APPLICATION & PRIORITY CLAIM

The present application claims priority to and the benefit of U.S. Patent Application No. 63/001,060 filed Mar. 27, 2020, which is hereby incorporated by reference in its entirety as if fully set forth below and for all applicable purposes.

TECHNICAL FIELD

This application relates to wireless communication systems, and more particularly to utilizing multiple channel sensing opportunities within a frame period.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands from low-frequency bands below about 1 gigahertz (GHz) and mid-frequency bands from about 1 GHz to about 6 GHz, to high-frequency bands such as millimeter wave (mmW) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may perform LBT to determine whether there are active transmissions in the channel. If the LBT results in an LBT pass, the transmitting node may transmit a preamble to reserve a channel occupancy time (COT) in the shared channel and may communicate with a receiving node during the COT.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes performing, by a first wireless communication device in a shared radio frequency band during a first portion of a frame period, a first listen-before-talk (LBT) using a first beam characteristic; performing, by the first wireless communication device in the shared radio frequency band during a second portion of the frame period, a second LBT using a second set of beam characteristics different from the first beam characteristic; and communicating, by the first wireless communication device with a second wireless communication device in the shared radio frequency band during the second portion of the frame period, one or more communication signals using the second set of beam characteristics.

In an aspect of the disclosure, an apparatus of wireless communication includes a processor configured to: perform, by a first wireless communication device in a shared radio frequency band during a first portion of a frame period, a first listen-before-talk (LBT) using a first beam characteristic; and perform, by the first wireless communication device in the shared radio frequency band during a second portion of the frame period, a second LBT using a second set of beam characteristics different from the first beam characteristic; and a transceiver configured to: communicate, by the first wireless communication device with a second wireless communication device in the shared radio frequency band during the second portion of the frame period, one or more communication signals using the second set of beam characteristics.

In an additional aspect of the disclosure, a computer-readable medium having program code recorded thereon, the program code including code for causing a first wireless communication device to perform in a shared radio frequency band during a first portion of a frame period, a first listen-before-talk (LBT) using a first beam characteristic; code for causing the first wireless communication device to perform in the shared radio frequency band during a second portion of the frame period, a second LBT using a second set of beam characteristics different from the first beam characteristic; and code for causing the first wireless communication device to communicate with a second wireless communication device in the shared radio frequency band during the second portion of the frame period, one or more communication signals using the second set of beam characteristics.

In an additional aspect of the disclosure, an apparatus includes means for performing, in a shared radio frequency band during a first portion of a frame period, a first listen-before-talk (LBT) using a first beam characteristic; means for performing, in the shared radio frequency band during a second portion of the frame period, a second LBT using a second set of beam characteristics different from the first beam characteristic; and means for communicating, with a second wireless communication device in the shared radio frequency band during the second portion of the frame period, one or more communication signals using the second set of beam characteristics.

In an aspect of the disclosure, a method of wireless communication includes communicating, by a first wireless communication device with a second wireless communication device, a first communication signal using a first beam characteristic during a frame period; transmitting, during the frame period, a feedback based on the first communication signal; and communicating, by the first wireless communication device with the second wireless communication device, a second communication signal using a second beam characteristic in response to the feedback.

In an aspect of the disclosure, an apparatus of wireless communication includes a transceiver configured to: communicate, by a first wireless communication device with a second wireless communication device, a first communication signal using a first beam characteristic during a frame period; transmit, during the frame period, a feedback based on the first communication signals; and communicate, by the first wireless communication device with the second wireless communication device, a second communication signal using a second beam characteristic in response to the feedback.

In an additional aspect of the disclosure, a computer-readable medium having program code recorded thereon, the program code including code for causing a first wireless communication device to communicate with a second wireless communication device, a first communication signal using a first beam characteristic during a frame period; code for causing the first wireless communication device to transmit, during the frame period, a feedback based on the first communication signal; and code for causing the first wireless communication device to communicate with the second wireless communication device, a second communication signal using a second beam characteristic in response to the feedback.

In an additional aspect of the disclosure, an apparatus includes means for communicating, with a second wireless communication device, a first communication signal using a first beam characteristic during a frame period; means for transmitting, during the frame period, a feedback based on the first communication signal; and means for communicating, with the second wireless communication device, a second communication signal using a second beam characteristic in response to the feedback.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
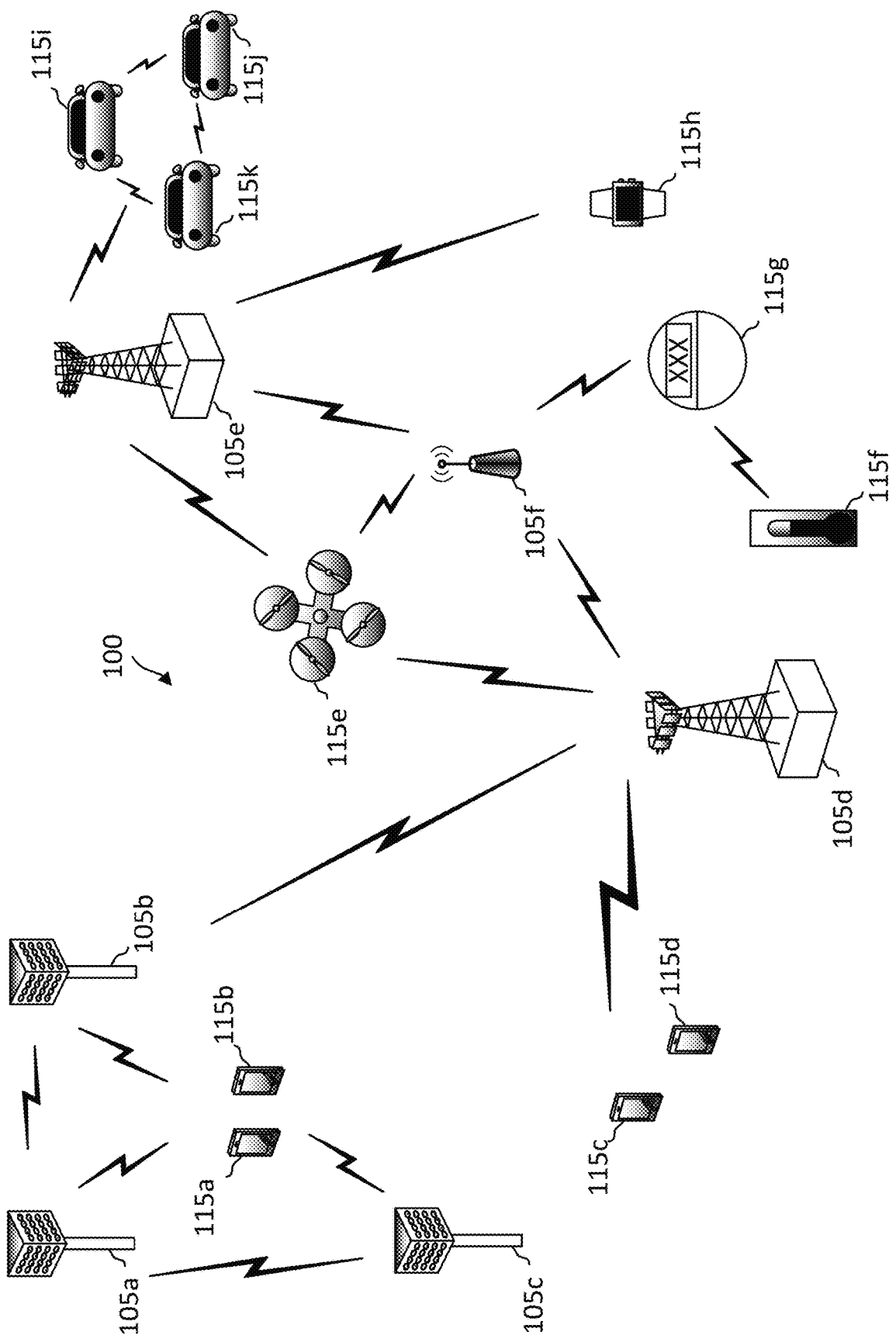
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including control with strong security to safeguard personal, financial, or classified information, ultra-high reliability (e.g., ~99.9999% reliability), ultra-low latency (e.g., ~1 milliseconds (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmW) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmW components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

Operators may share a channel and perform LBT before transmitting on the channel. An operator may correspond to a BS (e.g., BSs 105). In Frame Based Equipment (FBE), channel sensing may be performed at fixed time instants (e.g., LBT or clear channel assessment (CCA)). For example, the channel sensing may be performed once per frame period, and if the channel is busy, the wireless communication device (e.g., BS or UE) backs off for a fixed time period and senses the channel again after this period. If the channel is available, the wireless communication device may use the next fixed frame period (FFP) for communicating DL and/or UL transmissions for up to a maximum channel occupancy time (MCOT). The MCOT may also be referred to as a transmission period, which can be used for UL and/or DL transmissions.

In the FBE mode, a BS may perform channel sensing (e.g., LBT) once during a frame period. In mmW communication systems, the BS may perform an LBT per beam at a start of each portion of a frame period. The LBT procedure may include the BS monitoring the channel for a time period (e.g., that depends on the whether the LBT procedure is a one-shot LBT, a full LBT procedure, and the like). Directional beams are commonly used for mmW communications to combat the high path-loss in mmW. Due to the directional nature of mmW communications, the BS may perform an LBT over multiple beams during a contention period of the frame period. For example, the BS may perform during the contention period an LBT in three different spatial or beam directions per frame period. If the BS performs an LBT during a frame period and the LBT results in an LBT failure, the BS may wait for the next frame period to perform another LBT and attempt to occupy the shared medium. In this example, if the LBT results in an LBT failure, the BS may wait for an entire frame period before performing another LBT. It may be desirable to provide additional channel sensing opportunities in which the BS may perform LBT during the same frame period.

The present application provides techniques for improving transmission flexibility and accuracy of communication signals directed to a UE. In some aspects, the BS may configure a frame period including a plurality of portions, each portion including a contention period during which the BS may perform an LBT. For example, the BS may perform during a first portion of a frame period, a first LBT using a first beam characteristic and may perform during a second portion of the frame period, a second LBT using a second set of beam characteristics different from the first beam characteristic. Accordingly, even if the BS fails the first LBT, the BS may still be able to communicate one or more communication signals if the BS passes the second LBT during the frame period. Additionally, in some aspects, the first beam having the first beam characteristic may be a wider beam than each beam of a second set of beams having the second beam characteristics. The second set of beams may include narrow beams in different beam directions within a beam direction of the wider beam. By using a narrow beam that is contained within the wider sensed beam, the BS potentially may steer its energy in a narrower direction which avoids the interference causing the channel sensing on the wider beam to fail and thus to better target communications to the UE more efficiently from the perspective of interference management.

FIG. 1 illustrates a wireless communication network 100 according to one or more aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115e. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a PDSCH.

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for PDCCH monitoring, physical UL control channel (PUCCH), physical UL shared channel (PUSCH), power control, and SRS. In some aspects, SIB1 may contain cell access parameters and scheduling information for other SIBs.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. In some aspects, the BS 105 may communicate with a UE 115 using HARQ techniques to improve communication reliability, for example, to provide a URLLC service.

In some examples, BS 105 or UE 115 may be equipped with multiple antennas, which may be used to employ techniques such as transmit diversity, receive diversity, multiple input MIMO communications, or beamforming. For example, wireless communications system 100 may use a transmission scheme between a transmitting device (e.g., a BS 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MUMIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a BS 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a BS 105 may use multiple antennas or antenna arrays to conduct beamforming operations for directional communications with a UE 115. For instance, some signals (e.g. synchronization signals, reference signals, beam selection signals, or other control signals) may be transmitted by a BS 105 multiple times in different directions, which may include a signal being transmitted according to different beamforming weight sets associated with different directions of transmission. Transmissions in different beam directions may be used to identify (e.g., by the BS 105 or a receiving device, such as a UE 115) a beam direction for subsequent transmission and/or reception by the BS 105.

Some signals, such as data signals associated with a particular receiving device, may be transmitted by a BS 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the BS 105 in different directions, and the UE 115 may report to the BS 105 an indication of the signal it received with a highest signal quality, or an otherwise acceptable signal quality. Although these techniques are described with reference to signals transmitted in one or more directions by a BS 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may utilize multiple receive beams (e.g., by cycling through the multiple receive beams) when receiving various signals from the BS 105, such as synchronization signals, reference signals, beam selection signals, or other control signals. For example, a receiving device may be configured to receive signals in multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a BS 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations.

A network may operate over a licensed frequency band, a shared frequency band, and/or an unlicensed frequency band, for example, at about 3.5 gigahertz (GHz), sub-6 GHz or higher frequencies in the mmW band. The network 100 may partition a frequency band into multiple channels, each occupying about 20 megahertz (MHz). The BSs 105 and the UEs 115 may be operated by multiple network operating entities sharing resources in the shared or unlicensed frequency spectrum and may perform an LBT procedure (e.g., clear channel assessment (CCA)) prior to communicating to determine whether the channel is available. In some aspects, the BS 105 may employ an LBT procedure to reserve a COT in the shared medium for communications. A COT may refer to an amount of time a station can send frames when it has won contention for the wireless medium. In some aspects, a COT may also be referred to as a transmission opportunity (TXOP). Each COT may include a plurality of slots and one or more LBT or CCA periods.

The BS 105 may perform an LBT in the frequency band prior to transmitting in the frequency band and may transmit in one or more channels based on the LBT result. The BS 105 may perform an LBT based on energy detection and/or signal detection. The LBT may result in an LBT pass if the channel signal energy is below a threshold and/or no reservation signal is detected. Alternatively, the LBT may result in a failure if the channel signal energy is above a threshold and/or a reservation signal is detected. If the channel is available (performance of the LBT results in an LBT pass), the BS 105 may perform a DL transmission, receive an UL transmission from a UE 115, and/or schedule a UE 115 for data transmission and/or reception within a COT. If the channel is not available (performance of the LBT results in an LBT failure), the BS 105 may back off and perform the LBT procedure again at a later point in time. Additionally, the UE 115 may employ an LBT procedure (e.g., based on energy and/or signal detection) to ensure that the shared channel is clear before transmitting a signal in the shared channel. If the channel is available (performance of the LBT results in a LBT pass), the UE may perform an UL transmission. If the channel is not available (performance of the LBT results in a LBT failure), the UE may back off and perform the LBT procedure again at a later point in time.

Two broad types of LBT schemes may include Load Based Equipment (LBE) and FBE. In the LBE approach, the channel sensing (e.g., an LBT procedure) may be performed at any time instant and random back-off (with a fixed or variable size contention window) is used if the channel is found busy. In the FBE approach, channel sensing may be performed at fixed time instants (e.g., contention period or CCA). For example, the channel sensing may be performed once per frame period, and if the channel is busy, the wireless communication device (e.g., BS or UE) backs off for a fixed time period and senses the channel again after this period. In some aspects, channel sensing may be performed at a start of a current frame period. If the channel is available, the wireless communication device may use the current frame period for communicating DL and/or UL transmissions for up to an MCOT, which may also be referred to as a transmission period. In some aspects, channel sensing may be performed at an end of a current frame period. If the channel is available, the wireless communication device may use the next frame period for communicating DL and/or UL transmissions for up to the MCOT. While the present disclosure may describe channel sensing at the start of each frame period, it should be understood that in other examples the channel sensing may be performed at the end of each frame period for communicating DL and/or UL transmissions in the next frame period.

Figure 2:
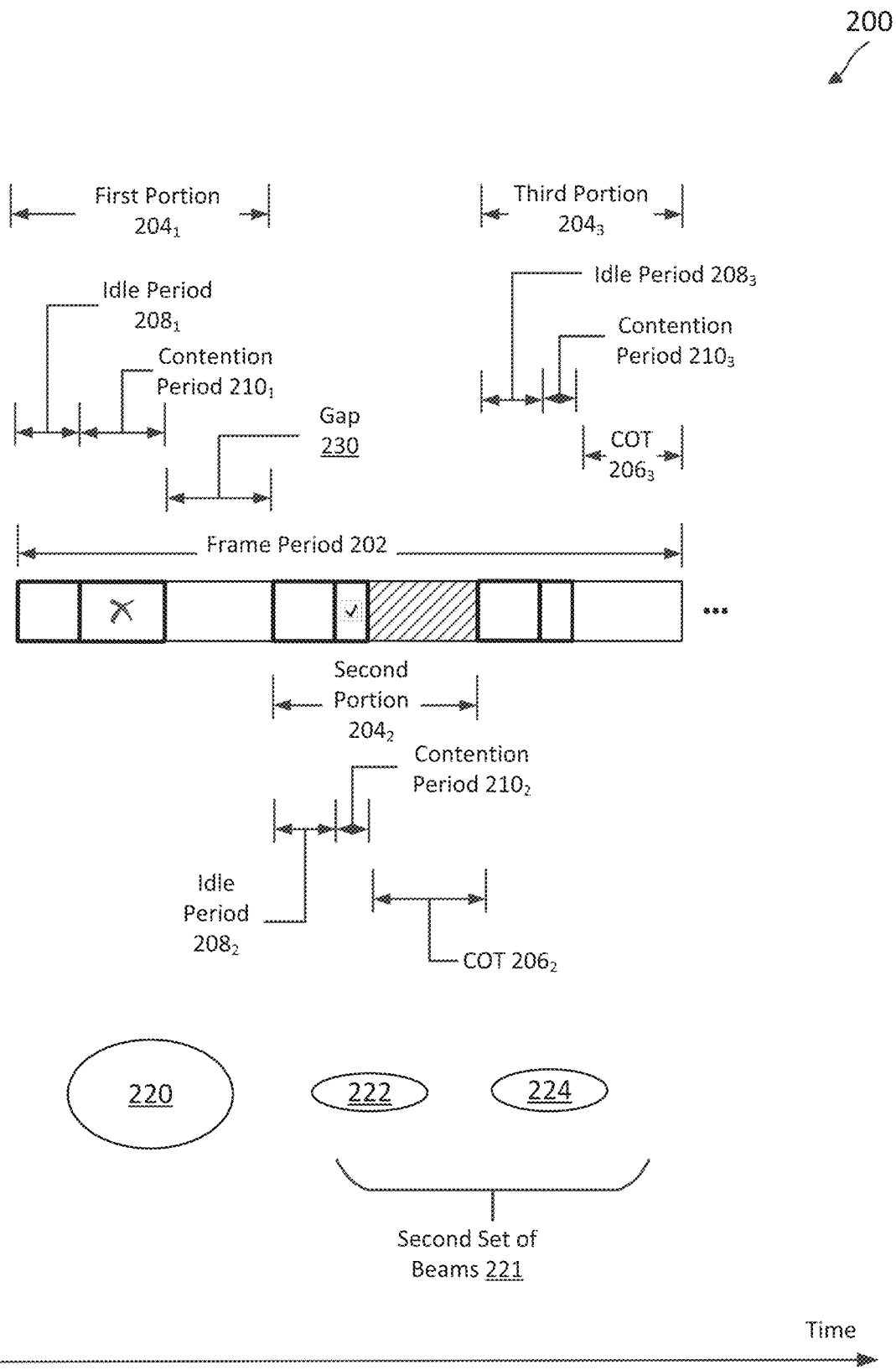
FIG. 2 illustrates a frame period scheme in accordance with one or more aspects of the present disclosure.

FIG. 2 illustrates a frame period scheme 200 in accordance with one or more aspects of the present disclosure. The frame period scheme 200 may be employed by the BS 105 and the UE 115 in a network such as the network 100 for communications. The x-axis represents time in some constant units. In FIG. 2, a frame period 202 includes one or more portions 204, where each portion may include an idle period 208, a contention period 210, and/or a COT 206. During the idle period 208, a plurality of BSs may be idle. During the contention period 210, the plurality of BSs may perform LBT in a frequency band and contend for the shared medium. A BS may perform LBT based on, for example, an energy detection threshold.

The frame period 202 may be fixed or configurable by the network 100. The frame period 202 may be an FBE frame period. In some aspects, the frame period 202 is configured from the range of about 1 ms to about 10 ms (e.g., 1, 2, 2.5, 4, 5, or 10 ms). The frame period, the portions of the frame period, the idle period, the contention period, and/or the COT may have fixed durations and/or predetermined times. In some aspects, each contention period may include one or more OFDM symbols, and each frame period may include one or more subframes, slots, or TTIs. In some aspects, the frame period may be defined in units of slots (e.g., about 250 microseconds (μs) long). The frame period structure may be pre-determined and known by all network operating entities sharing the shared spectrum. In some aspects, the network operating entities are time-synchronized when operating in the shared spectrum. In some aspects, the network operating entities are not time-synchronized when operating in the shared spectrum.

Before a BS 105 transmits a frame, the BS performs channel sensing (e.g., LBT) at the start of the frame. The frame period 202 includes a first portion 204$_1$ including an idle period 208$_1$ and a contention period 210$_1$, a second portion 204$_2$ including an idle period 208$_2$, a contention period 210$_2$, and a COT 206$_2$, and a third portion 204$_3$ including an idle period 208$_3$, a contention period 210$_3$, and a COT 206$_3$. The first portion 204$_1$ is located at a start of the frame period 202 and precedes the second portion 204$_2$ and the third portion 204$_3$ of the frame period 202.

In mmW communication systems, the BS 105 may perform an LBT per beam at a start of each portion of a frame period (e.g., FBE frame period). Due to the directional nature of mmW communications, the BS 105 may perform channel sensing over multiple beams during the contention period 210. In the example illustrated in FIG. 2, the BS 105 may perform channel sensing more than once during the frame period 202 by leveraging additional channel sensing opportunities that succeed the first channel sensing opportunity during the first portion 204$_1$. The additional channel sensing opportunities may refer to the contention period 210$_2$ of the second portion 204$_2$ and the contention period 210$_3$ of the third portion 204$_3$. Although two additional channel sensing opportunities are illustrated in FIG. 2, it should be understood that in other examples, fewer than two (e.g., one as an example) or more than two additional channel sensing opportunities may occupy a single frame period. By having additional channel sensing opportunities, it may be unnecessary for the BS 105 to wait for the next frame period to perform another LBT and attempt to occupy the shared medium if a result of the channel sensing during the first portion 204$_1$ indicates that the channel is busy.

In the example illustrated in FIG. 2, the BS 105 may perform an LBT during the contention period 210$_1$. In some aspects, the BS 105 may perform in a shared radio frequency band during the first portion 204$_1$ of the frame period 202, an LBT using a first beam characteristic. For instance, the BS 105 may configure an antenna array at an RF of the BS 105 to receive signals in a certain spatial or beam direction with a certain angle width or beam width based on the first beam characteristic. The configuration may include adjusting amplitudes and/or phases at the antenna array elements.

The BS 105 may perform the LBT using a beam 220 having the first beam characteristic. The first beam characteristic may be based on, for example, a spatial direction associated with an SSB beam, a CSI-RS beam, or the like. The BS 105 may transmit SSBs in various spatial or beam directions by sweeping from 0 to 360 degrees (e.g., 0 degrees, 45 degrees, 90 degrees, 135 degrees, and the like). For instance, if the BS transmits an SSB at 45 degrees, the beam (e.g., beam 220) may be at directed to the same direction as the SSB at 45 degrees. The first beam characteristic may include, for example, a shape of the first beam, a peak gain of the first beam, and/or a width of the first beam. A beam may be generated by scaling the output of each antenna element using an optimized amplitude and phase. A combination of such weighting over all the elements may generate the effective beam pattern. A Discrete Fourier Transform (DFT) beam is an example of a beam shape. A DFT beam may be generated by using the columns of a DFT matrix to weight the output of each antenna element. Each column may generate a beam in a different direction. This is not intended to be limiting, and other examples may include a beam shape different from a DFT beam. The peak gain of a beam may refer to a measure of input power in the main beam direction as a ratio relative to an isotropic antenna source. Based on a failed LBT (the LBT results in an LBT failure, as indicated by an "X" corresponding to the contention period 210$_1$), the BS 105 skips the COT 206 of the frame period 202 and accordingly does not transmit data during the COT 206. A gap 230 between an end of the contention period 210$_1$ and a start of the second portion 204$_2$ may indicate a failed channel sensing operation (e.g., an LBT failure) on the beam 220.

The BS 105 may perform an LBT using, for example, an energy detection threshold during the contention period $210_1$ of the first portion $204_1$. Based on the failed LBT during the contention period $210_1$, the BS 105 waits until the next contention period $210_2$ of the second portion $204_2$ to contend for the medium again and performs an LBT during the contention period $210_2$. In some aspects, the BS 105 may perform in the shared radio frequency band during the second portion $204_2$ of the frame period 202, an LBT using a second set of beam characteristics different from the first beam characteristic. The BS 105 may transmit a configuration for the second set of beams via, for example, an RRC message, a medium access control-control element (MAC-CE) message, or a DCI message. For instance, the BS 105 may configure an antenna array at an RF of the BS 105 to receive signals in a certain spatial or beam direction with a certain angle width or beam width based on the second set of beam characteristics. The configuration may include adjusting amplitudes and/or phases at the antenna array elements.

The BS 105 may perform the LBT using a second set of beams 221 having the second set of beam characteristics. The second set of beams 221 may include a beam 222 and a beam 224. The second set of beam characteristics may be based on, for example, a spatial direction associated with a PDCCH, a PDSCH, and/or a CSI-RS beam. The second set of beam characteristics may include, for example, a shape of a beam (e.g., beam 222) of the second set of beams, a peak gain of the beam of the second set of beams, and/or a width of the beam of the second set of beams.

Before performing the LBT during the next contention period $210_2$, it may be desirable to adjust the energy detection threshold used in performing the LBT during the contention period $210_1$ to achieve the desired coverage. In some aspects, the BS 105 may determine an energy detection threshold based on the first beam characteristic and may adjust the energy detection threshold to be different for the LBT based on the second set of beam characteristics. For example, the BS 105 may perform an LBT during the contention period $210_1$ of the first portion $204_1$ based on a first energy detection threshold and may perform an LBT during the contention period $210_2$ of the second portion $204_2$ based on a second energy detection threshold different from the first energy detection threshold. By adjusting the energy detection threshold for performing the LBT during the contention period $210_2$, the BS 105 may be more likely to pass LBT during the contention period $210_2$.

Based on a successful LBT (the LBT results in an LBT pass, as indicated by a checkmark corresponding to the contention period $210_2$), the BS may reserve a COT $206_2$ in the frequency band and communicate DL and/or UL signals during the COT $206_2$. The UE 115 may receive DL data from the BS 105 and transmit feedback for the DL data to the BS 105. The feedback may be an acknowledgement (ACK) indicating that reception of the DL data by the UE is successful (e.g., received the DL data without error) or may be a negative-acknowledgement (NACK) indicating that reception of the DL data by the UE is unsuccessful (e.g., including an error or failing an error correction). A pattern-filled box of FIG. 2 may represent transmissions of DCI, DL data, UL data, an ACK, and/or a NACK in corresponding slots. While an entire slot is pattern-filled, in aspects, a transmission may occur only in a corresponding portion of the slot.

In the example illustrated in FIG. 2, the BS 105 may perform wide beam channel sensing (e.g., using the beam 220 in FIG. 2) at the start of the frame period 202 (e.g., during the contention period $210_1$) and may transmit on any narrow beam (e.g., using the beam 222 and/or beam 224 in FIG. 2) covered by the wide beam within the frame period 202. While the typical FBE mode may provide for sensing once at the start of the frame period, the present application may provide techniques for additional channel sensing to be performed within a frame period to enable transmission with beams narrower than the one used for sensing at the start of the frame period 202 (e.g., during the contention period $210_1$). For example, use of the narrower beam may allow the BS 105 to target the transmission for better reception at the UE 115 in the PDSCH and/or the PDCCH.

In some aspects, the beam 220 having the first beam characteristic may be a wider beam than each beam of the second set of beams 221 having the second set of beam characteristics. For example, the second set of beams 221 may include a first narrow beam 222 and a second narrow beam 224, where the narrow beams are directed in different beam directions within a beam direction of the wider beam 220. The beam 220 may contain the second set of beams 221 within the frame period 202.

The BS 105 may restrict some aspects of the frame period 202. In some instances, the BS 105 may restrict a transmission duration within the frame period 202 for using a beam having the second set of beam characteristics. The BS 105 may restrict the duration of using a narrow beam for the additional channel sensing opportunities (e.g., contention period $210_2$ and contention period $210_3$) to, for example, reduce the interference, restrict the channel usage to essential transmissions, and the like. For example, the BS 105 may restrict a duration of the COT $206_2$, which may be longer than, the same as, or shorter than the COT duration (not shown) in the first portion $204_1$.

In some instances, the BS 105 may configure a first duration for performing an LBT during the contention period $210_1$ to be different from a second duration for performing an LBT after the contention period $210_1$ within the frame period 202 (e.g., during the contention period $210_2$ of the second portion $204_2$). For example, the BS 105 may restrict a duration of the contention period(s) within the frame period 202 such that a duration of the contention period $210_2$ of the second portion $204_2$ and/or a duration of the contention period $210_3$ of the third portion $204_3$ is shorter than the contention period $210_1$ of the first portion $204_1$. Accordingly, the BS 105 may perform channel sensing for a longer duration of time using the wider beam 220 during the contention period $210_1$. Additionally, for each subsequent portion within the frame period 202 after the first portion $204_1$, the BS 105 may perform channel sensing for a shorter duration of time and may search on a narrower beam 222, 224 that is contained within the wider beam 220. If the BS 105 passes LBT during the contention period $210_2$, which has a shorter channel sensing period than the contention period $210_1$, the BS 105 may use the narrower beam 222 for the remaining duration of the second portion $204_2$ (e.g., during the COT $206_2$). Accordingly, the beam 222 may be used during the contention period $210_2$ and during the COT $206_2$. Similarly, if the BS 105 passes LBT during the contention period $210_3$, which has a shorter channel sensing period than the contention period $210_1$, the BS 105 may use the narrower beam 224 for the remaining duration of the third portion $204_3$ (e.g., during the COT $206_3$). Accordingly, the beam 224 may be used during the contention period $210_3$ and during the COT $206_3$. In another example, the BS 105 may restrict a duration of the contention period $210_2$ such that the duration of the contention period $210_2$ and/or a duration of the contention period $210_3$ of the third portion $204_3$ is equal to or longer than the contention period $210_1$ of the first portion $204_1$.

In some instances, the second set of beams 221 may have a maximum number of beams determined based on the first beam characteristic. The BS 105 may impose a restriction on the maximum number of beams determined based on the first beam characteristic. For example, if the first beam characteristic covers X degrees, then the second set of beams 221 may have at most Y beams. In some examples, Y may be based on a beam width for each beam 221. In an example, if the first beam covers twenty degrees, then the second beam may cover five degrees. The BS may choose from one of four such beams spanning the original beam.

In some instances, the second set of beams 221 may be determined based on the first beam characteristic. The BS 105 may impose a restriction on the types of beams that are part of the second set of beams 221 based on the first beam characteristic. For example, if the first beam characteristic is based on a spatial direction associated with an SSB beam, then the second set of beam characteristics may be based on a spatial direction associated with a PDCCH, PDSCH, or a CSI-RS that are associated with the SSB beam. For instance, the BS 105 may configure a PDCCH, PDSCH, or a CSI-RS beam based on beam characteristics of an SSB beam. In another example, if the first beam characteristic is based on a spatial direction associated with a CSI-RS beam, then the second set of beam characteristics may be based on a spatial direction associated with a PDCCH, PDSCH, or a CSI-RS that are associated with the CSI-RS beam. For instance, the BS 105 may configure a PDCCH or PDSCH beam based on beam characteristics of a CSI-RS beam. Systems and methods for determining the second set of beams based on the first beam having the first beam characteristic are described in further detail in U.S. Provisional Patent Application No. 62/868,683 filed Jun. 28, 2019, entitled "LISTEN-BE-FORE-TALK BEAM OVERLAP MEASUREMENT PROCEDURES," which is incorporated herein by reference in its entirety.

A duration of the COT 206 may be dependent on the data load. If the BS 105 has a large amount of data to transmit that would exceed the COT 206, the BS transmits data until the end of the COT 206 and then performs LBT again at the start of the next frame period before continuing the data transmission.

In some aspects, the BS 105 may perform LBT using different beams during the additional channel sensing opportunities (e.g., contention period $210_2$ and/or the contention period $210_3$). The BS 105 may perform in the shared radio frequency band during the third portion $204_3$ of the frame period 202, an LBT using the second set of beam characteristics. The description regarding aspects of the second portion $204_2$ of the frame period 202 applies to the third portion $204_3$ of the frame period 202 as well (e.g., the BS 105 performing an LBT, communicating communication signals, restricting portions of the frame period, etc.). For example, the BS 105 may perform the LBT using the beam 224 having at least one beam characteristic of the second set of beam characteristics. If the LBT results in an LBT failure, the BS 105 skips the COT $206_3$ of the frame period 202 and accordingly does not transmit data during the COT $206_3$. The BS 105 may wait until the next contention period in the next frame period (not shown) to contend for the medium again and performs an LBT during the contention period. If the LBT results in an LBT pass, the BS 105 may reserve a COT $206_3$ in the frequency band and communicate DL and/or UL signals during the COT $206_3$ of the third portion $204_3$. For example, the BS 105 may communicate with a UE 115 in the shared radio frequency band during the third portion $204_3$ of the frame period 202, one or more communication signals (e.g., DL and/or UL communication signals) using the second set of beam characteristics. For example, the BS 105 may transmit the one or more communication signals using the beam 224 having at least one beam characteristic of the second set of beam characteristics.

Although the LBT during the contention period $210_1$ is described as resulting in an LBT failure, it should be understood that in other examples, the LBT may result in an LBT pass. If the LBT results in an LBT pass, the BS 105 may proceed with performing an LBT using a beam 222 during the next contention period (e.g., contention period $210_2$), where the beam 222 may be narrower than the beam 220. Additionally, if the LBT results in an LBT pass, the gap 230 may be smaller.

In some aspects, the BS 105 may communicate (e.g., transmit) during a first COT of the first portion $204_1$ of the frame period 202 one or more communication signals using a first transmit power and may communicate (e.g., transmit) during a second COT of the second portion $204_2$ of the frame period 202 one or more communication signals using a second transmit power different from the first transmit power. By adjusting the transmit power from the first transmit power to the second transmit power, the BS 105 may adjust the coverage of the one or more communication signals in the second portion $204_2$ of the frame period 202, for example, to communicate with the UE 115 more effectively.

During a portion of a frame period, the BS 105 may perform an LBT using one or more beam characteristics. In some aspects, the frame period is an FBE frame period. In the example illustrated in FIG. 2, additional sensing opportunities are provided within a single frame period 202. The contention periods $210_1$ and $210_2$ may be examples of the additional sensing opportunities within the single frame period 202.

Figure 3:
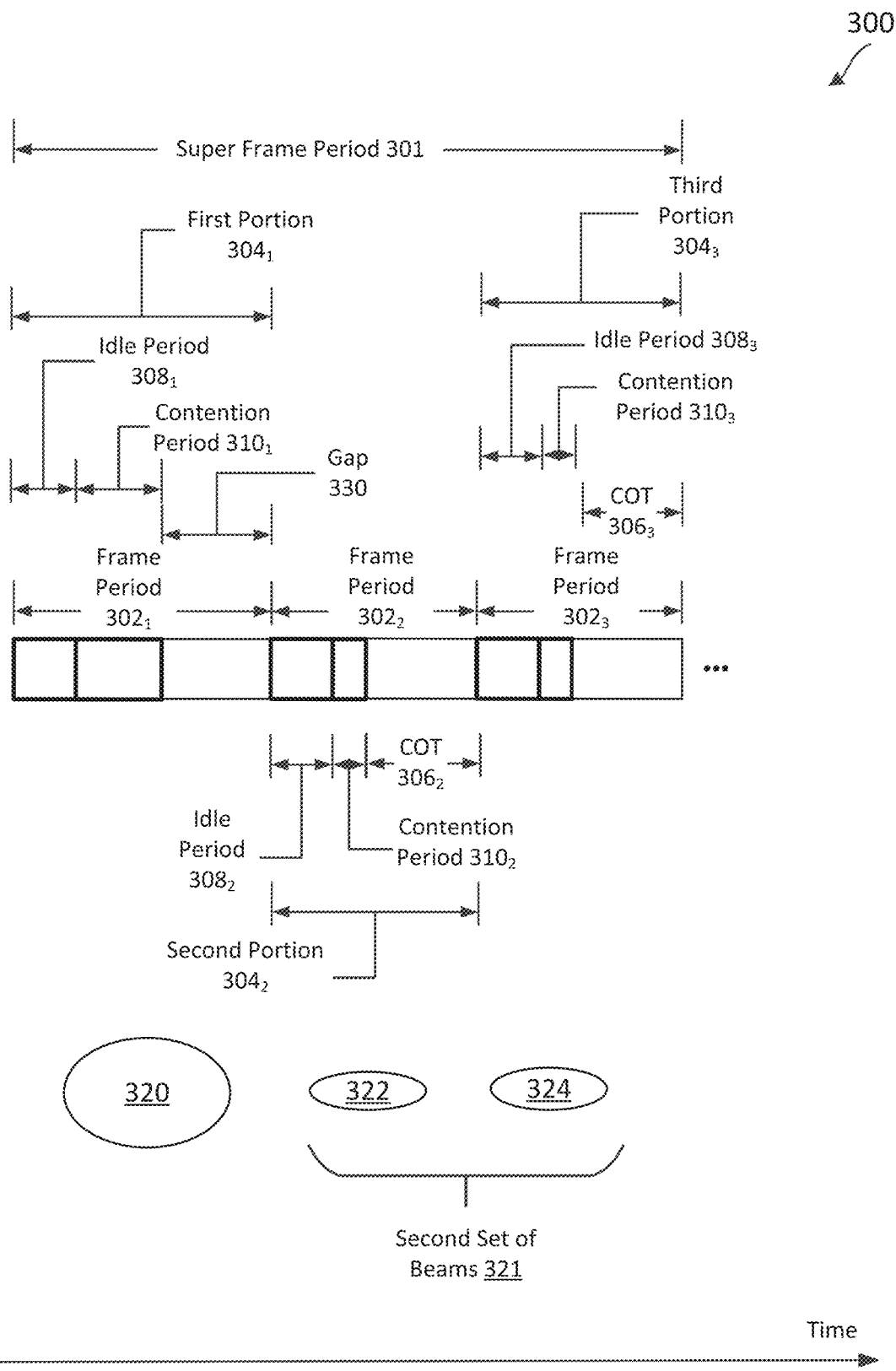
FIG. 3 illustrates a super frame period scheme in accordance with one or more aspects of the present disclosure.

In some aspects, the frame period is a super frame including a plurality of frame periods. FIG. 3 illustrates a super frame period scheme 300 in accordance with one or more aspects of the present disclosure. The super frame period scheme 300 may be employed by the BS 105 and the UE 115 in a network such as the network 100 for communications. The x-axis represents time in some constant units.

In FIG. 3, a super frame period 301 includes a plurality of N frame periods, where N is a number greater than one. In some aspects, each frame period of the plurality of N frame periods may be an FBE frame period. In the example illustrated in FIG. 3, the super frame period 301 includes a first portion $304_1$ including a frame period $302_1$, a second portion $304_2$ including a frame period $302_2$, and a third portion $304_3$ including a frame period $302_3$. The super frame period 301 may correspond to and be an example of the frame period 202 in FIG. 2. A portion 304 of the super frame period 301 may correspond to and be an example of a portion 204 in FIG. 2.

For example, each portion 304 or frame period 302 may include an idle period 308, a contention period 310, and/or a COT 306. For example, the first portion $304_1$ of the super frame period 301 includes an idle period $308_1$ and a contention period $310_1$ of the frame period $302_1$, the second portion $304_2$ of the super frame period 301 includes an idle period $308_2$, a contention period $310_2$, and a COT $306_2$ of the frame period $302_2$, and the third portion $304_3$ of the super frame period 301 includes idle period $308_3$, a contention period $310_3$, and a COT $306_3$ of the frame period $302_3$.

Although the super frame period 301 is shown in the example as including three portions and three frame periods, it should be understood that in other examples the super frame period 301 may include any number of portions (e.g., two or more frame periods) and any number of frame periods (e.g., two or more frame periods).

In mmW communication systems, the BS 105 may perform an LBT per beam at a start of each portion of the super frame period 301. The BS 105 may perform channel sensing more than once during the super frame period 301 by leveraging additional channel sensing opportunities that succeed the first channel sensing opportunity during the first portion $304_1$. The super frame 310 may have additional channel sensing opportunities than a typical FBE frame period. For example, the BS 105 may perform channel sensing in the shared radio frequency band during the first portion $304_1$, the second portion $304_2$, and the third portion $304_3$ of the super frame period 301. Although two additional channel sensing opportunities are illustrated in FIG. 3, it should be understood that in other examples, fewer than two (e.g., one as an example) or more than two additional channel sensing opportunities may occupy a super frame. By having additional channel sensing opportunities, it may be unnecessary for the BS 105 to wait for the next frame period or next portion within the super frame to perform another LBT and attempt to occupy the shared medium if a result of the channel sensing during the first portion $304_1$ indicates that the channel is busy.

In some aspects, the BS 105 may perform in a shared radio frequency band during the first portion $304_1$ (e.g., during the contention period $310_1$) of the super frame period 301, a first LBT using the first beam characteristic. For instance, the BS 105 may configure an antenna array at an RF of the BS 105 to receive signals in a certain spatial or beam direction with a certain angle width or beam width based on the first beam characteristic. The configuration may include adjusting amplitudes and/or phases at the antenna array elements. The first beam characteristic may be based on, for example, a spatial direction associated with an SSB beam, associated with a CSI-RS beam, or the like. The first beam characteristic may include, for example, a shape of the first beam, a peak gain of the first beam, and/or a width of the first beam. Based on a failed LBT, the BS 105 skips a COT of the super frame period 301 and accordingly does not transmit data during the COT. A gap 330 between an end of the contention period $310_1$ and a start of the second portion $304_2$ may indicate a failed channel sensing operation (e.g., an LBT failure) on the beam 320.

The BS 105 may perform an LBT using, for example, an energy detection threshold during a contention period $310_1$ of the first portion $304_1$ and adjust the energy detection threshold for subsequent portions (e.g., second portion $304_2$ or third portion $304_3$) in the super frame period 301, as discussed above in relation to the frame period 202 in FIG. 2. The BS 105 may perform in the shared radio frequency band during the second portion $304_2$ (e.g., during the contention period $310_2$) of the super frame period 301, a second LBT using a second set of beam characteristics different from the first beam characteristic. For instance, the BS 105 may configure an antenna array at an RF of the BS 105 to receive signals in a certain spatial or beam direction with a certain angle width or beam width based on the second set of beam characteristics. The configuration may include adjusting amplitudes and/or phases at the antenna array elements.

The BS 105 may perform the first LBT using a first beam 320 having the first beam characteristic and may perform the second LBT using the second set of beams 321 having the second set of beam characteristics. The BS 105 may configure the second set of beams 321 via, for example, an RRC message, a MAC-CE message, or a DCI message. For example, the BS 105 may transmit a configuration for the second set of beams. The second set of beams 321 includes a beam 322 and a beam 324. The second set of beam characteristics may be based on, for example, a spatial direction associated with a PDCCH, a PDSCH, and/or a CSI-RS beam. The second set of beam characteristics may include, for example, a shape of a beam (e.g., beam 322) of the second set of beams, a peak gain of the beam of the second set of beams, and/or a width of the beam of the second set of beams. The BS 105 may perform the second LBT using the beam 322 having at least one beam characteristic of the second set of beam characteristics. Additionally, the BS 105 may perform a third LBT using the second set of beam characteristics. The BS 105 may perform the third LBT using the beam 324 having at least one beam characteristic of the second set of beam characteristics. Based on a successful LBT (the second LBT results in an LBT pass), the BS 105 may reserve a COT $306_2$ in the frequency band and communicate DL and/or UL signals during the COT $306_2$. Based on a failed LBT (the second LBT results in an LBT failure), the BS 105 may skip the COT $306_2$ in the frequency band and determine to not communicate DL and/or UL signals during the COT $306_2$. In this example, the BS 105 may perform the third LBT during the contention period $310_3$, as discussed. In some aspects, the BS 105 may perform LBT using different beams during the additional channel sensing opportunities (e.g., the beam 322 during the contention period $310_2$ and/or the beam 324 during the contention period $310_3$).

The beam 320 may correspond to and be an example of the beam 220, the beam 322 may correspond to and be an example of the beam 222, and the beam 324 may correspond to and be an example of the beam 224. The description regarding the beam 220, the beam 222, and/or the beam 224 in relation to FIG. 2 applies as well to the beam 320, the beam 322, and/or the beam 324, respectively, in FIG. 3.

In the example illustrated in FIG. 3, the BS 105 may perform wide beam channel sensing (e.g., using the beam 320 in FIG. 3) at the start of the frame period $302_1$ (e.g., during the contention period $310_1$) and may transmit on any narrow beam (e.g., using the beam 322 and/or beam 324) covered by the wide beam within the frame period $302_1$. While the typical FBE mode may provide for sensing once at the start of the frame period, the present application may provide techniques for additional channel sensing to be performed within the super frame period 301 to enable transmission with beams narrower than the one used for sensing at the start of the frame period $302_1$ (e.g., during the contention period $310_1$). By using a narrow beam that is contained within the wider sensed beam, the BS 105 may direct its energy to better target communications to the UE 115 more efficiently and accurately. For example, use of the narrower beam may allow the BS 105 to target the transmission for better reception at the UE 115 in the PDSCH and/or the PDCCH.

In some aspects, the beam 320 having the first beam characteristic may be a wider beam than each beam of the second set of beams 321 having the second set of beam characteristics. For example, the second set of beams 321 may include a first narrow beam 322 and a second narrow beam 324, where the narrow beams are directed in different beam directions within a beam direction of the wider beam 320. The beam 320 may contain the second set of beams 321 within the super frame period 301.

For example, the BS 105 may restrict some aspects of the super frame period 301. In some instances, the BS 105 may restrict a transmission duration within the super frame period 301 for using a beam having the second set of beam characteristics. The BS 105 may restrict the duration of using a narrow beam for the additional channel sensing opportunities (e.g., contention period $310_2$ and contention period $310_3$) to, for example, reduce the interference, restrict the channel usage to essential transmissions, and the like. For example, the BS 105 may restrict a duration of the COT $306_2$, which may be longer than, the same as, or shorter than the COT duration in the first portion $304_1$.

In some instances, the BS 105 may configure a first duration for performing an LBT during the contention period $310_1$ to be different from a second duration for performing an LBT after the contention period $310_1$ within the super frame period 301 (e.g., during the contention period $310_2$ of the second portion $304_2$). For example, the BS 105 may restrict a duration of the contention period(s) within the super frame period 301 such that a duration of the contention period $310_2$ of the second portion $304_2$ and/or a duration of the contention period $310_3$ of the third portion $304_3$ is shorter than the contention period $310_1$ of the first portion $304_1$. Accordingly, the BS 105 may perform channel sensing for a longer duration of time using the wider beam 320 during the contention period $310_1$. Additionally, for each subsequent portion within the super frame period 301 after the first portion $304_1$, the BS 105 may perform channel sensing for a shorter duration of time and may search on a narrower beam 322, 324 that is contained within the wider beam 320. If the BS 105 passes LBT during the contention period $310_2$, which has a shorter channel sensing period than the contention period $310_1$, the BS 105 may use the narrower beam 322 for the entire duration of the frame period $302_2$. Similarly, if the BS 105 passes LBT during the contention period $310_3$, which has a shorter channel sensing period than the contention period $310_1$, the BS 105 may use the narrower beam 324 for the entire duration of the frame period $302_3$. In another example, the BS 105 may restrict a duration of the contention period $310_2$ such that the duration of the contention period $310_2$ and/or a duration of the contention period $310_3$ of the third portion $304_3$ is equal to or longer than the contention period $310_1$ of the first portion $304_1$.

In some instances, the second set of beams 321 may have a maximum number of beams determined based on the first beam characteristic. The BS 105 may impose a restriction on the maximum number of beams determined based on the first beam characteristic. In some instances, the second set of beams 321 may be determined based on the first beam characteristic. The BS 105 may impose a restriction on the types of beams that are part of the second set of beams 321 based on the first beam characteristic. For example, if the first beam characteristic is based on a spatial direction associated with an SSB beam, then the second set of beam characteristics may be based on a spatial direction associated with a PDCCH, PDSCH, or a CSI-RS that are associated with the SSB beam. For instance, the BS 105 may configure a PDCCH, PDSCH, or a CSI-RS beam based on beam characteristics of an SSB beam. In another example, if the first beam characteristic is based on a spatial direction associated with a CSI-RS beam, then the second set of beam characteristics may be based on a spatial direction associated with a PDCCH, PDSCH, or a CSI-RS that are associated with the CSI-RS beam.

Figure 4:
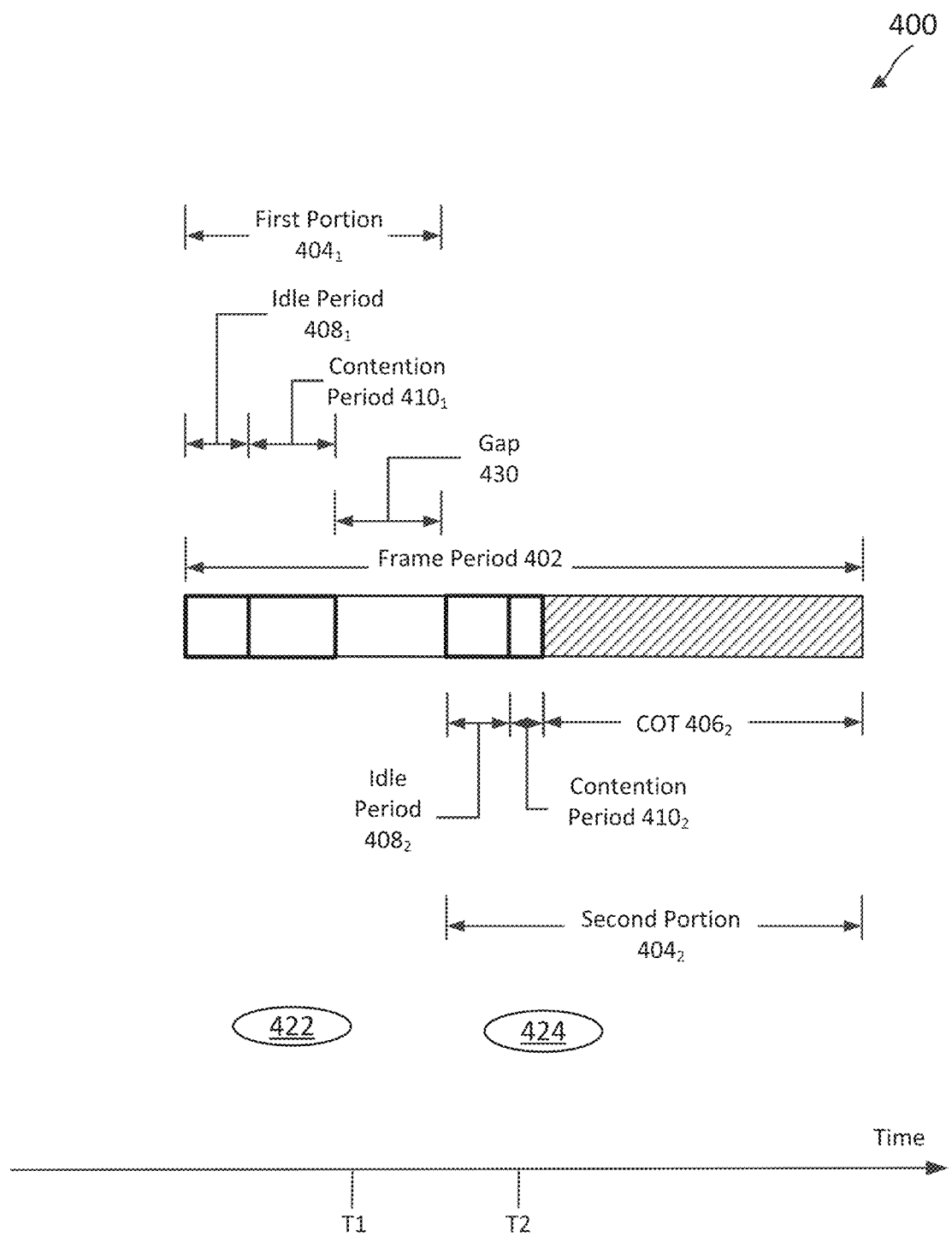
FIG. 4 illustrates a frame period scheme in accordance with one or more aspects of the present disclosure.

FIG. 4 illustrates a frame period scheme 400 in accordance with one or more aspects of the present disclosure. The frame period scheme 400 may be employed by the BS 105 and the UE 115 in a network such as the network 100 for communications. The x-axis represents time in some constant units. In FIG. 4, a frame period 402 includes one or more portions 404, and each portion may include an idle period 408, a contention period 410, and/or a COT 406.

In some aspects, the BS 105 may determine to switch beams during the frame period 402. It may be desirable for the BS 105 to switch from a second beam 424 having a second beam characteristic to a first beam 422 having a first beam characteristic during the frame period 402. The BS 105 may determine to switch beams during the frame period 402 because the BS 105 may determine that the second beam 424 has a higher signal quality (e.g., providing a higher signal-to-noise ratio (SNR)) than the first beam 422. If the BS 105 were unable to use the second beam 424 during the frame period 402, loss of throughput may result due to the first beam 422 being used for the first LBT during the first portion $404_1$ of the frame period 402. While the BS 105 may wait until the next frame period after the frame period 402 to serve on the second beam 424 and/or may use the first beam 422 until the end of the frame period 402, doing so would be inefficient for the BS 105 in terms, for example, of scheduling accuracy, latency, and/or throughput. In some aspects, the BS 105 may switch beams from the first beam 422 to the second beam 424 during a frame period 402. The BS 105 may perform the switch during a low duty cycle.

In some aspects, the BS 105 performs measurements in the channel to determine a beam having a higher signal quality than other beams in the channel Based on comparing the measurements, the BS 105 may switch to the beam having a higher signal quality than other beams in the channel and transmit on the beam. For example, the BS 105 may perform in a shared radio frequency band during a first portion $404_1$ of the frame period 402, a first LBT using a first beam 422 having a first beam characteristic. A first beam may have the first beam characteristic, and the BS 105 may perform a first measurement using the first beam 422 to receive a signal from the channel. The first measurement may be, for example, an energy measurement in the channel After the BS 105 performs the first LBT during the first portion $404_1$ or performs the first measurement based on the first beam 422, the BS 105 may compare the first measurement to a threshold (e.g., energy detection threshold). The first measurement may be, for example, an energy measurement in the channel. The BS 105 may determine, based on comparing the first measurement to the threshold, whether to switch from the first beam to a second beam 424 having a second set of beam characteristics different from the first beam characteristic. The BS 105 may determine to switch from the first beam in the shared radio frequency band to the second beam 424 if the channel sensing operation for the first beam fails or the BS receives a report from the UE indicating that the second beam is better suited to the UE (ex. It provides better channel quality).

The BS 105 may perform in the shared radio frequency band during a second portion $404_2$ of the frame period 402, a second LBT using the second beam 424. The BS 105 may perform a second measurement based on the second beam 424 after switching from the first beam 422 to the second beam 424. The BS 105 may perform the second measurement using the second beam 424 to receive a signal from the channel. The second measurement may be, for example, an energy measurement in the channel. If the second measurement of the second beam 424 indicates a higher signal quality than the first measurement of the first beam 422, then the BS 105 may determine to switch from the first beam to the second beam for future communications. If the BS 105 switches from the first beam 422 to the second beam 424 during the frame period 402, the BS 105 may then communicate during the second portion $404_2$ (e.g., during the COT $406_2$) of the frame period 402, one or more communication signals using the second set of beam characteristics. For example, the BS 105 may transmit one or more communication signals using the second beam 424. The first beam 422 and the second beam 424 may be in different beam directions, where the second beam 424 has a higher signal quality than the first beam 422.

In some aspects, the BS 105 determines, based on feedback from the UE 115, a beam having a higher signal quality than other beams in the channel Based on the feedback, the BS 105 may switch to the beam having a higher signal quality than other beams in the channel and transmit on the beam. For example, at time T1 during the frame period 402, the BS 105 may receive a report specifying that the second beam 424 has a higher signal quality than the first beam 422 that was used by the BS 105 to perform LBT in the first portion $404_1$ of the frame period 402. The BS 105 may receive the report at time T1, which may be, for example, during the contention period $410_1$ or during a gap 430 of the first portion $404_1$. The report may include feedback from the UE 115, where the feedback may indicate that the second beam 424 has a higher signal quality than the first beam 422 for the UE 115. Based on the report, the BS 105 may switch from the second beam 424 to the first beam 422 during the frame period 402. For example, the UE 115 may transmit the report including feedback indicating that a second beam characteristic of the second set of beam characteristics has a higher signal quality than the first beam characteristic. The BS 105 may receive the report and determine, based on the feedback, to switch from the first beam 422 having the first beam characteristic to the second beam 424 having the second beam characteristic. At time T2, which is subsequent to time T1 and may be within the contention period $410_2$, the BS 105 may perform an LBT using the second beam 424. The BS 105 may determine to communicate the one or more communication signals using the second beam 424 based on the switch from the first beam 422 to the second beam 424 and communicate the communication signals accordingly.

In some aspects, the UE 115 may provide feedback to the BS 105, which may determine to switch from the first beam 422 to the second beam 424 based on the feedback. For example, the UE 115 may communicate with the BS 105, a first communication signal using a first beam characteristic during the frame period 402 (e.g., an FBE period). The UE 115 may receive the first communication signal during a first portion $404_1$ of the frame period 402 and may perform a measurement on the first communication signal. In some aspects, performing the measurement may include energy sensing irrespective of the underlying signal. In some scenarios, the node may monitor for a specific signature sequence. If the sequence is detected, the node may check if the energy of the signature sequence is above a threshold. The UE 115 may transmit, during the frame period 402, feedback based on the first communication signal. The BS 105 may receive the feedback between the contention period $404_1$ of the first portion $404_1$ and a start of the second portion $404_2$. The feedback may be provided in a report specifying that the second beam 424 has a higher signal quality than the first beam 422. The BS 105 may have performed a first LBT using the first beam 422 having the first beam characteristic and may switch from the first beam 422 to the second beam 424 having the second beam characteristic. The BS 105 may perform a second LBT using the second beam 424 and communicate a second communication signal using the second beam characteristic in response to the feedback to the UE 115. In an example, if the second communication signal includes a DL communication signal, the BS 105 transmits the DL communication signal to the UE 115. In this example, the UE 115 may receive from the BS 105, the DL communication signal based on the second beam characteristic in response to the feedback. In another example, if the second communication signal includes an UL communication signal, the UE 115 transmits the UL communication signal to the UE 115. In this example, the BS 105 may receive from the UE 115, the UL communication signal based on the second beam characteristic in response to the feedback.

Figure 5:
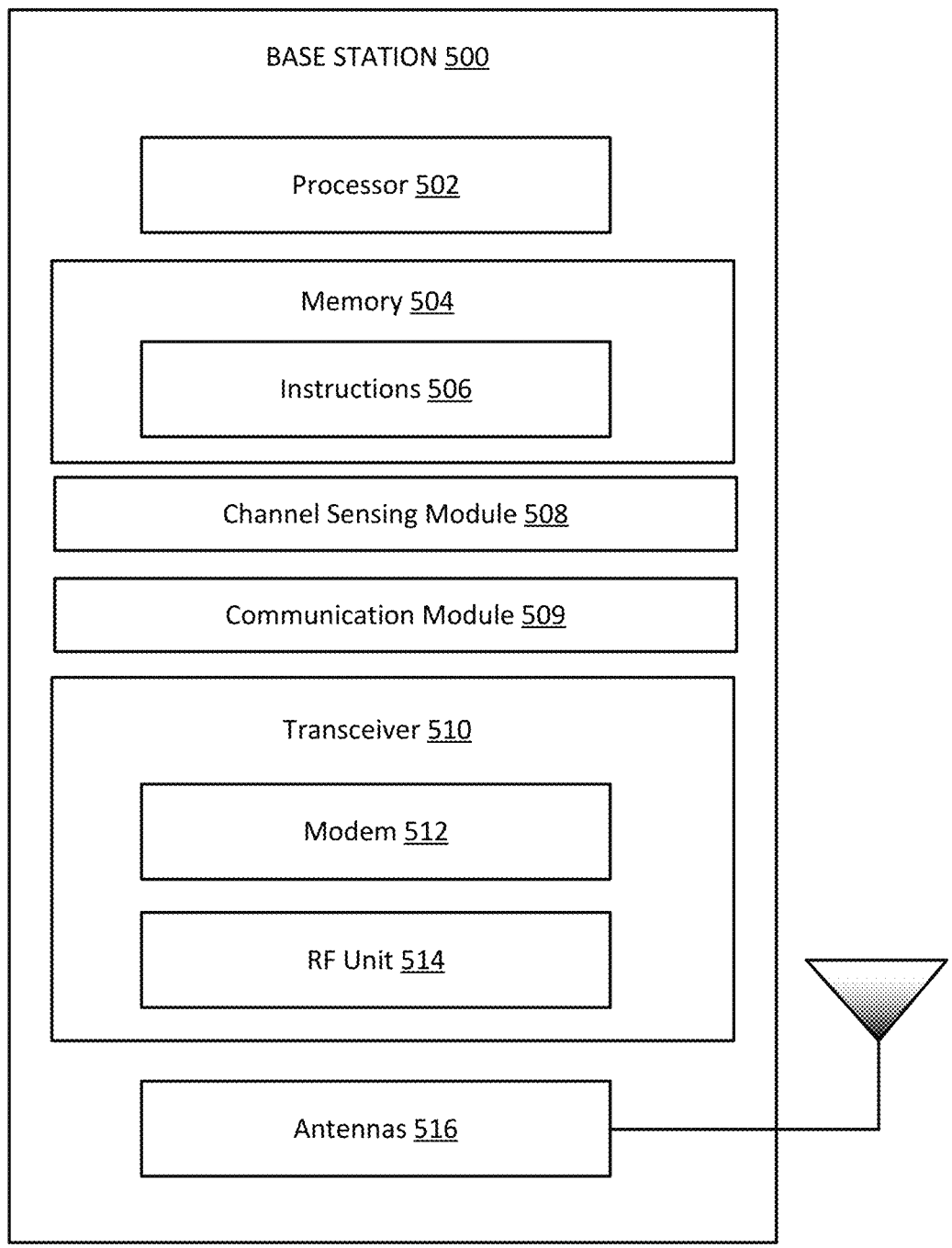
FIG. 5 illustrates a block diagram of a base station (BS) according to one or more aspects of the present disclosure.

FIG. 5 illustrates a block diagram of an example BS 500 according to one or more aspects of the present disclosure. The BS 500 may be a BS 105 as discussed above in relation to FIG. 1. As shown, the BS 500 may include a processor 502, a memory 504, a channel sensing module 508, a communication module 509, a transceiver 510 including a modem subsystem 512 and radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the BSs (e.g., BS 105) in connection with aspects of the present disclosure, for example, aspects of FIGS. 1, 2, 3, 4, and/or 7. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The channel sensing module 508 and/or the communication module 509 may be implemented via hardware, software, or combinations thereof. For example, the channel sensing module 508 and/or the communication module 509 may be implemented as a processor, circuit, and/or instructions 506 stored in the memory 504 and executed by the processor 502. In some instances, the channel sensing module 508 and/or the communication module 509 can be integrated within the modem subsystem 512. For example, the channel sensing module 508 and/or the communication module 509 can be implemented by a combination of software components (e.g., executed by a DSP or a general processor) and hardware components (e.g., logic gates and circuitry) within the modem subsystem 512.

The channel sensing module 508 and/or the communication module 509 may be used for various aspects of the present disclosure, for example, aspects of FIGS. 1, 2, 3, 4, and/or 7. In some aspects, the channel sensing module 508 may be configured to perform, by a first wireless communication device in a shared radio frequency band during a first portion of a first frame period, a first LBT using a first beam characteristic. The channel sensing module 508 may be configured to perform, by the first wireless communication device in the shared radio frequency band during a second portion of the first frame period, a second LBT using a second set of beam characteristics different from the first beam characteristic. In some aspects, the communication module 509 may be configured to communicate, by the first wireless communication device with a second wireless communication device in the shared radio frequency band during the second portion of the first frame period, one or more communication signals using the second set of beam characteristics.

As shown, the transceiver 510 may include the modem subsystem 512 and the RF unit 514. The transceiver 510 can be configured to communicate bi-directionally with other devices, such as the UE 115, another BS, and/or another core network element. The modem subsystem 512 may be configured to modulate and/or encode the data from the memory 504, the channel sensing module 508 and/or the communication module 509 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., values associated with performing an LBT, one or more beam characteristics, communication signals using one or more beam characteristics, feedback from a UE, measurements based on a beam having one or more beam characteristics, etc.) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices. The BS 500 may perform an LBT using a beam having one or more beam characteristics. For instance, the BS 500 may configure an antenna array at the RF unit 614 of the BS 600 to receive signals in a certain spatial or beam direction with a certain angle width or beam width using the one or more beam characteristics. The configuration may include adjusting amplitudes and/or phases at the antenna array elements.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 according to one or more aspects of the present disclosure. The antennas 516 may further receive data messages transmitted from other devices and provide the received data messages for processing and/or demodulation at the transceiver 510. The transceiver 510 may provide the demodulated and decoded data (e.g., values associated with performing an LBT, one or more beam characteristics, communication signals using one or more beam characteristics, feedback from a UE, measurements using a reception beam having one or more beam characteristics, etc.) to the channel sensing module 508 and/or the communication module 509 for processing. The antennas 516 may include multiple antennas of similar or different designs in order to sustain multiple transmission links. The RF unit 514 may configure the antennas 516.

In some aspects, the transceiver 510 may coordinate with the communication module 509 to transmit to the UE in the shared radio frequency band during the second portion of the first frame period, one or more communication signals using the second set of beam characteristics. In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
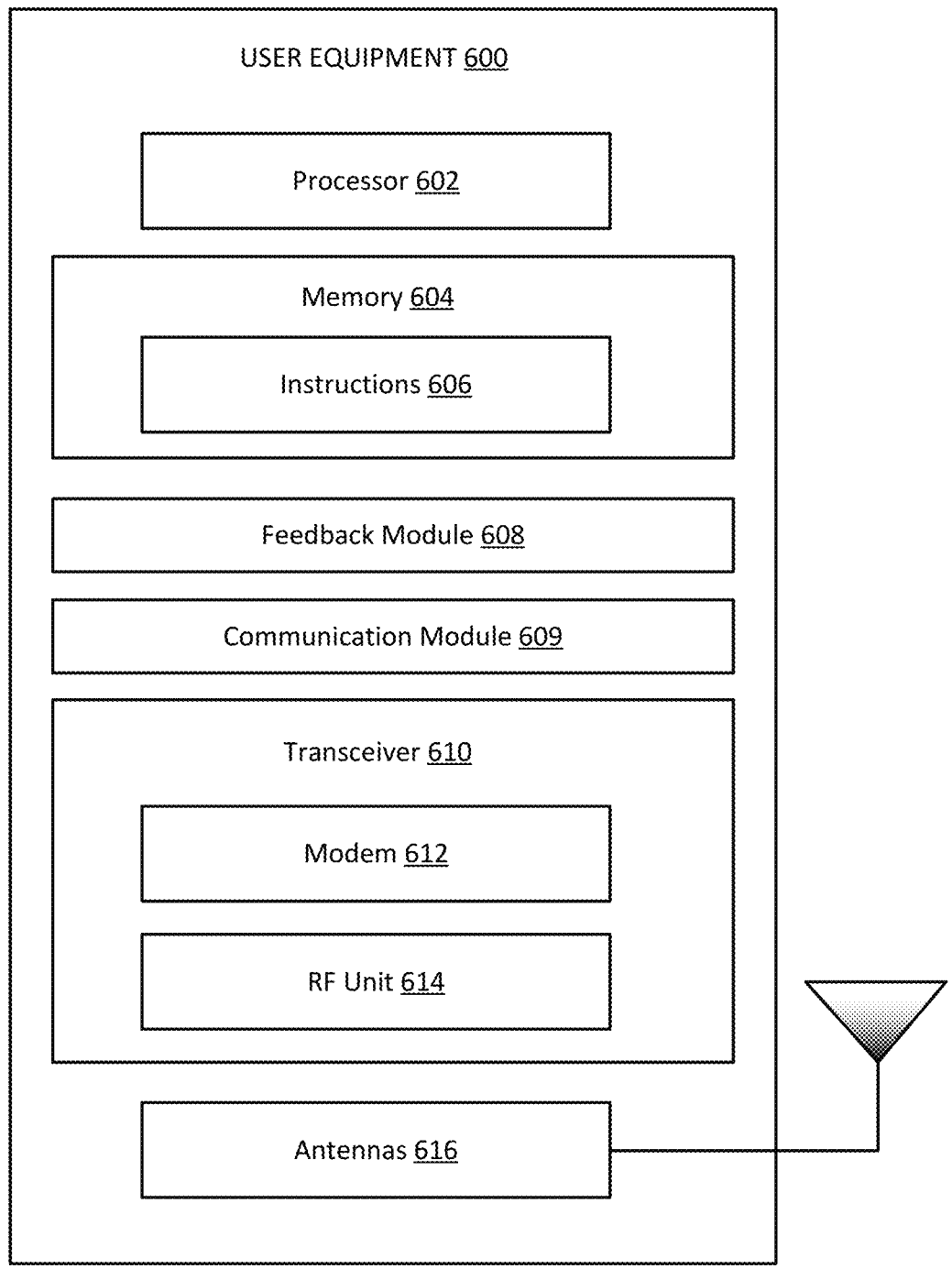
FIG. 6 illustrates a block diagram of a user equipment (UE) according to one or more aspects of the present disclosure.

FIG. 6 illustrates a block diagram of an example UE 600 according to one or more aspects of the present disclosure. The UE 600 may be a UE 115 as discussed above in FIG. 1. As shown, the UE 600 may include a processor 602, a memory 604, a feedback module 608, a communication module 609, a transceiver 610 including a modem subsystem 612 and an RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects FIGS. 1, 2, 3, 4, and/or 8. Instructions 606 may also be referred to as program code. The program code may be for causing a wireless communication device to perform these operations, for example by causing one or more processors (such as processor 602) to control or command the wireless communication device to do so. The instructions 606 may also be referred to as code, which may be interpreted broadly to include any type of computer-readable statement(s) as discussed above with respect to FIG. 5.

The feedback module 608 and/or the communication module 609 may be implemented via hardware, software, or combinations thereof. For example, the feedback module 608 and/or the communication module 609 may be implemented as a processor, circuit, and/or instructions 606 stored in the memory 604 and executed by the processor 602. In some instances, the feedback module 608 and/or the communication module 609 can be integrated within the modem subsystem 612. For example, the feedback module 608 and/or the communication module 609 can be implemented by a combination of software components (e.g., executed by a DSP or a general processor) and hardware components (e.g., logic gates and circuitry) within the modem subsystem 612.

The feedback module 608 and/or the communication module 609 may be used for various aspects of the present disclosure, for example, aspects of FIGS. 1, 2, 3, 4, and/or 8. In some aspects, the communication module 609 may be configured to communicate, by a first wireless communication device with a second wireless communication device (e.g., a BS 105), a first communication signal using a first beam characteristic during a frame period (e.g., a FBE period). In some aspects, the feedback module 608 may be configured to transmit, during the frame period, feedback based on the first communication signal. In some aspects, the communication module 609 may be configured to communicate, by the first wireless communication device with the second wireless communication device, a second communication signal using a second beam characteristic in response to the feedback.

As shown, the transceiver 610 may include the modem subsystem 612 and the RF unit 614. The transceiver 610 can be configured to communicate bi-directionally with other devices, such as the BSs 105 and/or another core network element. The modem subsystem 612 may be configured to modulate and/or encode the data from the memory 604, the feedback module 608 and/or the communication module 609 according to an MCS, e.g., a LDPC coding scheme, a turbo coding scheme, a convolutional coding scheme, a polar coding scheme, a digital beamforming scheme, etc. The RF unit 614 may be configured to process (e.g., perform analog to digital conversion or digital to analog conversion, etc.) modulated/encoded data (e.g., values associated with performing an LBT, one or more beam characteristics, communication signals using one or more beam characteristics, feedback from a UE, measurements using a reception beam having one or more beam characteristics, etc.) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and/or the RF unit 614 may be separate devices that are coupled together at the UE 115 to enable the UE 115 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., values associated with performing an LBT, one or more beam characteristics, communication signals using one or more beam characteristics, feedback from a UE, measurements using a reception beam having one or more beam characteristics, etc.) to the feedback module 608 and/or the communication module 609 for processing. The antennas 616 may include multiple antennas of similar or different designs in order to sustain multiple transmission links. The RF unit 614 may configure the antennas 616.

In some aspects, the transceiver 610 may coordinate with the communication module 609 to communicate with a second wireless communication device, a first communication signal using a first beam characteristic during a frame period (e.g., FBE period). In some aspects, the transceiver 610 may coordinate with the feedback module 608 to transmit, during the frame period, feedback based on the first communication signal. In some aspects, the transceiver 610 may coordinate with the communication module 609 to communicate, by the first wireless communication device with the second wireless communication device, a second communication signal using a second beam characteristic in response to the feedback. In some aspects, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
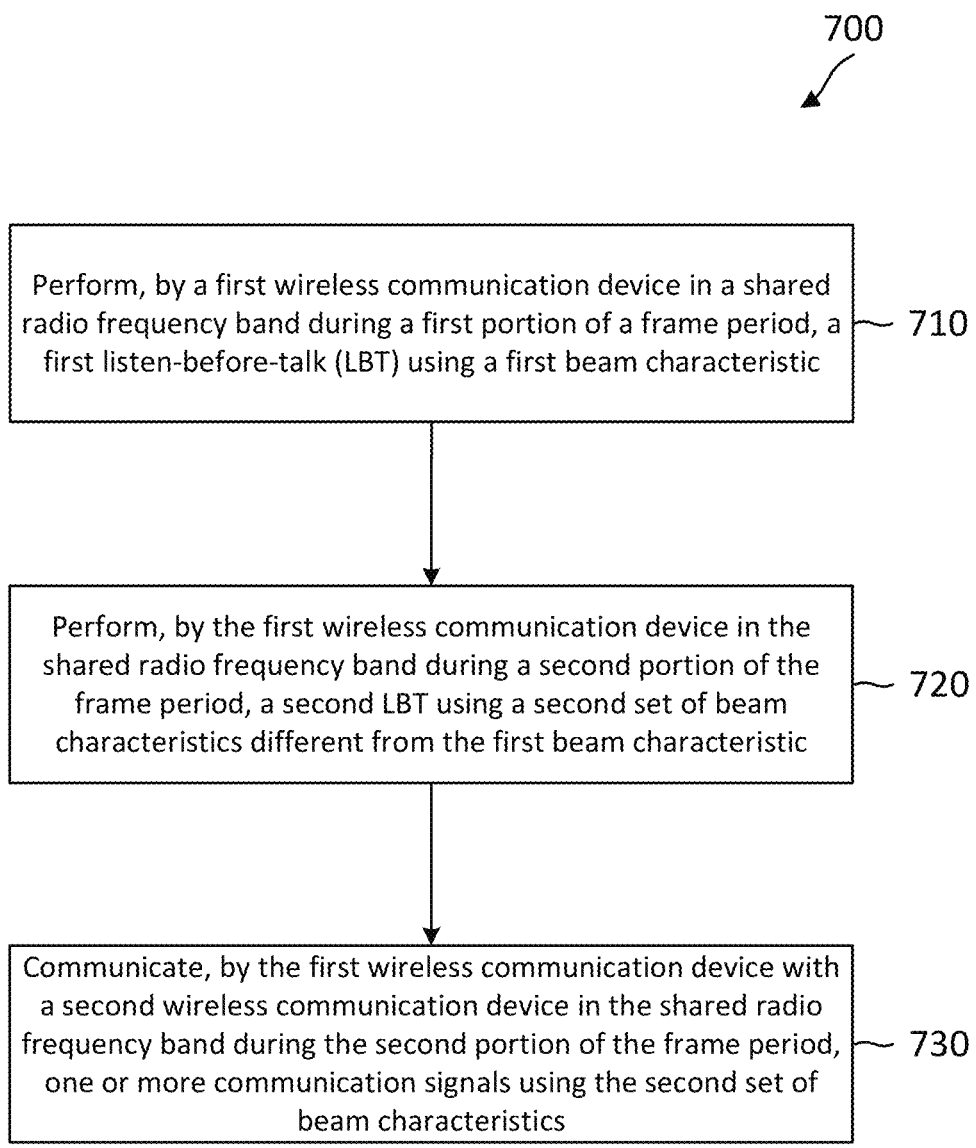
FIG. 7 illustrates a flow diagram of a communication method for communicating one or more communication signals using one or more beam characteristics according to one or more aspects of the present disclosure.

FIG. 7 illustrates a flow diagram of a communication method 700 for communicating one or more communication signals using one or more beam characteristics according to one or more aspects of the present disclosure. Blocks of the method 700 can be executed by a computing device (e.g., a processor, processing circuit, and/or other suitable component) of a wireless communication device. In some aspects, the wireless communication device is a BS (e.g., BSs 105 and/or BS 500) that may utilize one or more components, such as the processor 502, the memory 504, the channel sensing module 508, the communication module 509, the transceiver 510, and/or the antennas 516 to execute the blocks of the method 700. The method 700 may employ similar mechanisms as in the frame period scheme 200 in FIG. 2, the super frame period scheme 300 in FIG. 3, and/or the frame period scheme 400 in FIG. 4. As illustrated, the method 700 includes a number of enumerated blocks, but aspects of the method 700 may include additional blocks before, after, and/or in between the enumerated blocks. In some aspects, one or more of the enumerated blocks may be omitted or performed in a different order.

At block 710, the method 700 includes performing, by a first wireless communication device in a shared radio frequency band during a first portion of a frame period, a first LBT using a first beam characteristic. In an example, the channel sensing module 508 may perform the first LBT using a first beam having the first beam characteristic. The first beam characteristic may include at least one of a shape of the first beam, a peak gain of the first beam, or a width of the first beam. The frame period may include an FBE frame period or may include a super frame having a plurality of frame periods (e.g., a plurality of FBE frame periods).

At block 720, the method 700 includes performing, by the first wireless communication device in the shared radio frequency band during a second portion of the frame period, a second LBT using a second set of beam characteristics different from the first beam characteristic. In some aspects, the channel sensing module 508 may perform the second LBT using a second set of beams having the second set of beam characteristics. A duration of a first contention period in which the channel sensing module 508 performs the first LBT may be longer than a duration of a second contention period in which the channel sensing module 508 performs the second LBT.

The second portion of the frame period for using a beam having a beam characteristic of the second set of beam characteristics may be restricted by the first wireless communication device. The second set of beam characteristics may include at least one of a shape of a beam of the second set of beams, a peak gain of the beam of the second set of beams, or a width of the beam of the second set of beams. Additionally or alternatively, the second set of beams may have a maximum number of beams determined based on the first beam characteristic. The communication module 509 in the BS 500 may transmit a configuration for the second set of beams via at least one of an RRC message, a MAC-CE message, or a DCI message.

The first portion may be at a start of the frame period and may precede the second portion of the frame period. The first beam may contain the second set of beams within the frame period. The first beam characteristic may be based on a spatial direction associated with an SSB beam or a CSI-RS beam. The second set of beam characteristics may be based on a spatial direction associated with a PDCCH, a PDSCH, or a CSI-RS beam. Additionally or alternatively, a first beam having the first beam characteristic may be a wider beam than each beam of the second set of beams having the second beam characteristics. The second set of beams may include a first narrow beam and a second narrow beam in different beam directions within a beam direction of the wider beam.

A duration of performing the first LBT may be different from a duration of performing the second LBT. In an example, the channel sensing module 508 in the BS 500 may perform a second LBT based on an LBT failure of the first LBT. In another example, the channel sensing module 508 in the BS 500 may perform a second LBT based on an LBT pass of the first LBT. In some aspects, the channel sensing module 508 may perform the LBT using a first energy detection threshold and perform the second LBT using a second energy detection threshold different from the first energy detection threshold.

At block 730, the method 700 includes communicating, by the first wireless communication device with a second wireless communication device in the shared radio frequency band during the second portion of the frame period, one or more communication signals using the second set of beam characteristics. In some aspects, the communication module 509 in the BS 500 may communicate with a UE 115 in the shared radio frequency band during the first portion of the frame period, one or more communication signals based on the first set of beam characteristics. The communication module 509 may communicate the one or more communication signals based on the first set of beam characteristics by communicating one or more communication signals based on a first transmit power. Additionally, the communication module 509 may communicate one or more communication signals based on the second set of beam characteristics by communicating one or more communication signals based on a second transmit power different from the first transmit power.

In some aspects, the channel sensing module 508 may perform in the shared radio frequency band during a third portion of the frame period, a third LBT using a third beam having the second set of beam characteristics. In some aspects, the channel sensing module 508 may perform in the shared radio frequency band during the first portion of the frame period, a first measurement using a first beam having the first beam characteristic. The channel sensing module 508 may determine to switch from the first beam in the shared radio frequency band to a second beam having the second set of beam characteristics based on comparing the first measurement to a threshold, where the first beam characteristic is different from the second set of beam characteristics. The communication module 509 may determine to communicate the one or more communication signals using the second beam based on the switch from the first beam to the second beam. In some aspects, the communication module 508 may receive from a UE 115, a feedback indicating a second beam characteristic of the second set of beam characteristics. The communication module 508 may determine, based on the feedback, to switch from a first beam having the first beam characteristic to a second beam having the second beam characteristic. Additionally, the communication module 508 may determine to communicate the one or more communication signals using the second beam based on the switch from the first beam to the second beam.

Figure 8:
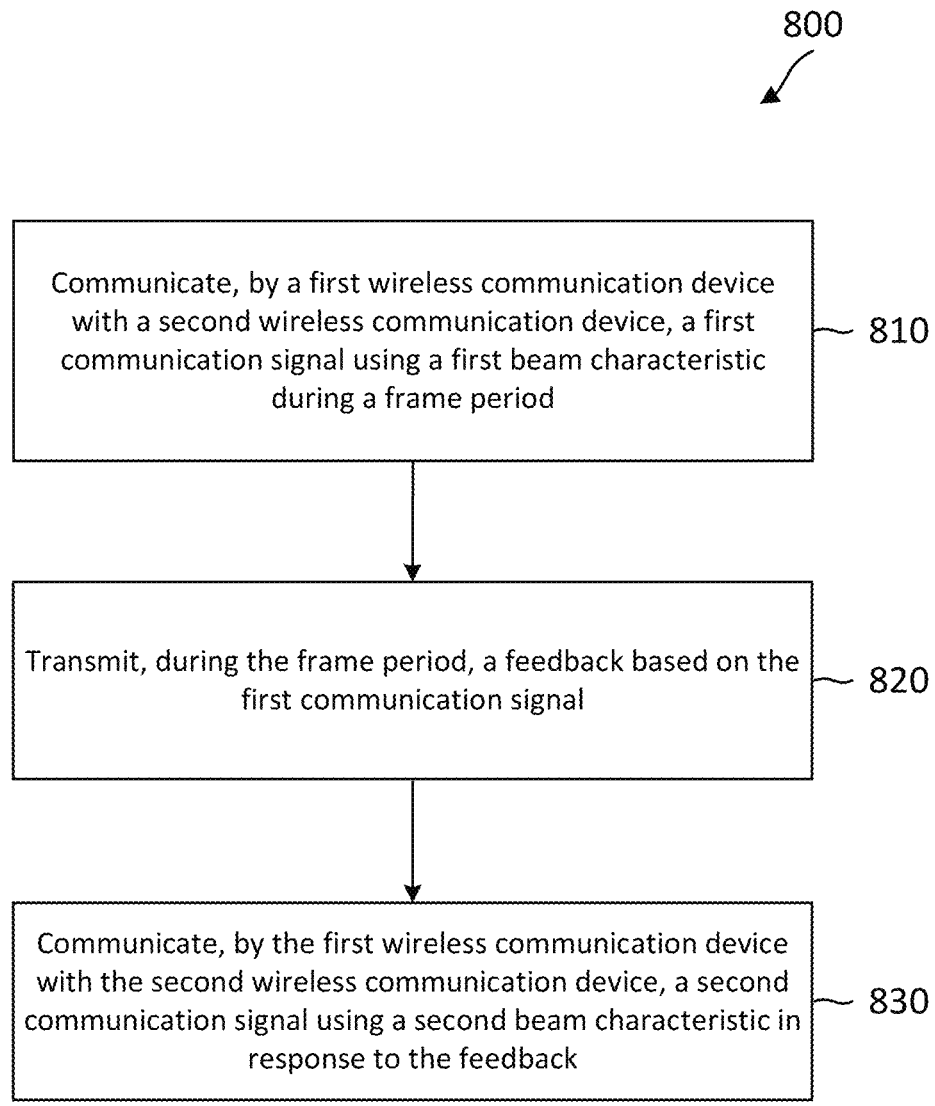
FIG. 8 illustrates a flow diagram of a communication method for communicating one or more communication signals using one or more beam characteristics according to one or more aspects of the present disclosure.

FIG. 8 illustrates a flow diagram of a communication method 800 for communicating one or more communication signals using one or more beam characteristics according to one or more aspects of the present disclosure. Blocks of the method 800 can be executed by a computing device (e.g., a processor, processing circuit, and/or other suitable component) of a wireless communication device. In some aspects, the wireless communication device is a UE (e.g., UEs 115 and/or UE 600) that may utilize one or more components, such as the processor 602, the memory 604, the feedback module 608, the communication module 609, the transceiver 610, and/or the antennas 616 to execute the blocks of the method 800. The method 800 may employ similar mechanisms as in the frame period scheme 200 in FIG. 2, the super frame period scheme 300 in FIG. 3, and/or the frame period scheme 400 in FIG. 4. As illustrated, the method 800 includes a number of enumerated blocks, but aspects of the method 800 may include additional blocks before, after, and/or in between the enumerated blocks. In some aspects, one or more of the enumerated blocks may be omitted or performed in a different order.

At block 810, the method 800 includes communicating, by a first wireless communication device with a second wireless communication device, a first communication signal using a first beam characteristic during a frame period. The frame period may include an FBE frame period. In an example, the communication module 609 may receive the first communication signal from the BS 105. The first beam characteristic may include at least one of a shape of a first beam having the first beam characteristic, a peak gain of the first beam, or a width of the first beam.

At block 820, the method 800 includes transmitting, during the frame period, a feedback based on the first communication signal. The feedback may indicate a beam index identifying the second beam characteristic.

At block 830, the method 800 includes communicating, by the first wireless communication device with the second wireless communication device, a second communication signal using a second beam characteristic in response to the feedback. The second beam characteristic may include at least one of a shape of a second beam having the second beam characteristic, a peak gain of the second beam, or a width of the second beam.

In some aspects, wherein the frame period a first beam having the first beam characteristic may contain the second beam having the second beam characteristic. Additionally or alternatively, the first beam having the first beam characteristic may be a wider beam than the second beam having the second beam characteristic. Additionally or alternatively, a first beam having the first beam characteristic and a second beam having the second beam characteristic may be in different beam directions within a beam direction of a wider beam.

In some aspects, a method of wireless communication includes: performing, by a first wireless communication device in a shared radio frequency band during a first portion of a frame period, a first listen-before-talk (LBT) using a first beam characteristic; performing, by the first wireless communication device in the shared radio frequency band during a second portion of the frame period, a second LBT using a second set of beam characteristics different from the first beam characteristic; and communicating, by the first wireless communication device with a second wireless communication device in the shared radio frequency band during the second portion of the frame period, one or more communication signals using the second set of beam characteristics.

In some examples, performing a second LBT is based on an LBT failure of the first LBT. In some examples, performing a second LBT is based on an LBT pass of the first LBT. In some examples, performing the first LBT includes performing the first LBT using a first beam having the first beam characteristic, and performing the second LBT includes performing the second LBT using a second set of beams having the second set of beam characteristics. In some cases, the first beam characteristic includes at least one of a peak gain of the first beam or a width of the first beam. In some cases, the second set of beam characteristics includes at least one of a peak gain of the beam of the second set of beams or a width of the beam of the second set of beams. In some cases, the second set of beams has a maximum number of beams determined based on the first beam characteristic. In some cases, the method of wireless communication includes transmitting, by the first wireless communication device, a configuration for the second set of beams via at least one of radio resource control (RRC) message, a medium access control-control element (MAC-CE) message, or a downlink control information (DCI) message. In some cases, the method of wireless communication includes performing, by the first wireless communication device in the shared radio frequency band during a third portion of the frame period, a third LBT using a third beam having the second set of beam characteristics. In some cases, the first beam contains the second set of beams within the frame period.

In some examples, a duration of performing the first LBT is different from a duration of performing the second LBT. In some examples, performing the first LBT includes performing the first LBT using a first energy detection threshold, and performing the second LBT includes performing the second LBT using a second energy detection threshold different from the first energy detection threshold. In some examples, the method of wireless communication includes communicating, by the first wireless communication device with the second wireless communication device in the shared radio frequency band during the first portion of the frame period, one or more communication signals using the first beam characteristic, where communicating one or more communication signals using the first beam characteristic includes communicating one or more communication signals using a first transmit power, and where communicating one or more communication signals using the second set of beam characteristics includes communicating one or more communication signals using a second transmit power different from the first transmit power.

In some examples, the first beam characteristic is based on a spatial direction associated with a synchronization signal block (SSB) beam. In some examples, the first beam characteristic is based on a spatial direction associated with a channel state information-reference signal (CSI-RS) beam. In some examples, the second set of beam characteristics is based on a spatial direction associated with a physical downlink control channel (PDCCH). In some examples, the second set of beam characteristics is based on a spatial direction associated with a physical downlink shared channel (PDSCH). In some examples, the second set of beam characteristics is based on a spatial direction associated with a CSI-RS beam. In some examples, the first portion is at a start of the frame period. In some examples, the first portion of the frame period precedes the second portion of the frame period. In some examples, a first beam having the first beam characteristic is a wider beam than each beam of a second set of beams having the second set of beam characteristics. In some cases, the second set of beams includes a first narrow beam and a second narrow beam in different beam directions within a beam direction of the wider beam.

In some examples, the second portion of the frame period for using a beam having a beam characteristic of the second set of beam characteristics is restricted by the first wireless communication device. In some cases, the frame period includes a frame based equipment (FBE) frame period. In some cases, the frame period includes a plurality of FBE frame periods, where the first portion includes a first contention period of a first FBE frame period of the plurality of FBE frame periods, the second portion includes a second contention period of a second FBE frame period of the plurality of FBE frame periods, and the first FBE frame period precedes the second FBE frame period. In some examples, performing the first LBT includes performing, by the first wireless communication device in the shared radio frequency band during the first contention period of the first FBE frame period, the first LBT using the first beam characteristic, and performing the second LBT includes performing, by the first wireless communication device in the shared radio frequency band during the second contention period of the second 1-BE frame period, the second LBT using the second set of beam characteristics. In some cases, a duration of the first contention period is longer than a duration of the second contention period. In some cases, the method of wireless communication includes performing, by the first wireless communication device in the shared radio frequency band during a third portion of the frame period, a third LBT using a third beam having at least one beam characteristic of the second set of beam characteristics. In some examples, the third portion includes a third contention period of a third 1-BE frame period of the plurality of FBE frame periods, and performing the third LBT includes performing, by the first wireless communication device in the shared radio frequency band during the third contention period of the third FBE frame period, the third LBT.

In some examples, the method of wireless communication includes performing, by the first wireless communication device in the shared radio frequency band during the first portion of the frame period, a first measurement using a reception beam having the first beam characteristic; and determining, by the first wireless communication device, to switch from the first beam in the shared radio frequency band to a second beam having the second set of beam characteristics based on comparing the first measurement to a threshold, the first beam characteristic being different from the second set of beam characteristics. In some cases, the method of wireless communication includes determining, by the first wireless communication device, to communicate the one or more communication signals using the second beam based on the switch from the first beam to the second beam.

In some examples, the method of wireless communication includes receiving, by the first wireless communication device from the second wireless communication device, a feedback indicating a second beam characteristic of the second set of beam characteristics; determining, based on the feedback, to switch from a first beam having the first beam characteristic to a second beam having the second beam characteristic; and determining, by the first wireless communication device, to communicate the one or more communication signals using the second beam based on the switch from the first beam to the second beam.

In some aspects, a method of wireless communication includes: communicating, by a first wireless communication device with a second wireless communication device, a first communication signal using a first beam characteristic during a frame period; transmitting, during the frame period, a feedback based on the first communication signal; and communicating, by the first wireless communication device with the second wireless communication device, a second communication signal using a second beam characteristic in response to the feedback. In some examples, the frame period includes a frame based equipment (FBE) frame period. In some cases, the feedback indicates a beam index identifying the second beam characteristic. In some cases, the first beam characteristic includes at least one of a shape of a first beam having the first beam characteristic, a peak gain of the first beam, or a width of the first beam. In some examples, the second beam characteristic includes at least one of a shape of a second beam having the second beam characteristic, a peak gain of the second beam, or a width of the second beam. In some cases, within the frame period a first beam having the first beam characteristic contains the second beam having the second beam characteristic. In some cases, the first beam having the first beam characteristic is a wider beam than the second beam having the second beam characteristic. In some cases, a first beam having the first beam characteristic and a second beam having the second beam characteristic are in different beam directions within a beam direction of a wider beam.

In some aspects, an apparatus includes a processor and a transceiver, where the processor is configured to: perform, by a first wireless communication device in a shared radio frequency band during a first portion of a frame period, a first listen-before-talk (LBT) using a first beam characteristic; and perform, by the first wireless communication device in the shared radio frequency band during a second portion of the frame period, a second LBT using a second set of beam characteristics different from the first beam characteristic; and the transceiver is configured to communicate, by the first wireless communication device with a second wireless communication device in the shared radio frequency band during the second portion of the frame period, one or more communication signals using the second set of beam characteristics. In some examples, the processor is configured to: perform the first LBT using a first beam having the first beam characteristic; and perform the second LBT using a second set of beams having the second set of beam characteristics. In some cases, the first beam characteristic includes at least one of a shape of the first beam, a peak gain of the first beam, or a width of the first beam. In some cases, the second set of beam characteristics includes at least one of a peak gain of the beam of the second set of beams or a width of the beam of the second set of beams. In some cases, the second set of beams has a maximum number of beams determined based on the first beam characteristic. In some cases, the transceiver is configured to transmit, by the first wireless communication device, a configuration for the second set of beams via at least one of radio resource control (RRC) message, a medium access control-control element (MAC-CE) message, or a downlink control information (DCI) message. In some examples, the processor is configured to perform, by the first wireless communication device in the shared radio frequency band during a third portion of the frame period, a third LBT using a third beam having the second set of beam characteristics. In some examples, the first beam contains the second set of beams within the frame period.

In some examples, a first beam having the first beam characteristic is a wider beam than each beam of a second set of beams having the second set of beam characteristics. In some cases, the second set of beams includes a first narrow beam and a second narrow beam in different beam directions within a beam direction of the wider beam. In some examples, the frame period includes a frame based equipment (FBE) frame period. In some examples, the frame period includes a plurality of FBE frame periods, where the first portion includes a first contention period of a first FBE frame period of the plurality of FBE frame periods, the second portion includes a second contention period of a second FBE frame period of the plurality of FBE frame periods, and the first FBE frame period precedes the second FBE frame period. In some cases, the processor is configured to: perform, by the first wireless communication device in the shared radio frequency band during the first contention period of the first FBE frame period, the first LBT using the first beam characteristic; and perform, by the first wireless communication device in the shared radio frequency band during the second contention period of the second FBE frame period, the second LBT using the second set of beam characteristics. In some cases, a duration of the first contention period is longer than a duration of the second contention period. In some cases, the processor is configured to perform, by the first wireless communication device in the shared radio frequency band during a third portion of the frame period, a third LBT using a third beam having at least one beam characteristic of the second set of beam characteristics. In some examples, the third portion includes a third contention period of a third FBE frame period of the plurality of FBE frame periods, where the processor is configured to perform, by the first wireless communication device in the shared radio frequency band during the third contention period of the third 1-BE frame period, the third LBT. In some cases, the processor is configured to: perform, by the first wireless communication device in the shared radio frequency band during the first portion of the frame period, a first measurement using a reception beam having the first beam characteristic; and determine, by the first wireless communication device, to switch from the first beam in the shared radio frequency band to a second beam having the second set of beam characteristics based on comparing the first measurement to a threshold, wherein the first beam characteristic is different from the second set of beam characteristics. In some cases, the processor is configured to determine, by the first wireless communication device, to communicate the one or more communication signals using the second beam based on the switch from the first beam to the second beam. In some examples, the transceiver is configured to receive, by the first wireless communication device from the second wireless communication device, a feedback indicating a second beam characteristic of the second set of beam characteristics, and the processor is configured to: determine, based on the feedback, to switch from a first beam having the first beam characteristic to a second beam having the second beam characteristic; determine, by the first wireless communication device, to communicate the one or more communication signals using the second beam based on the switch from the first beam to the second beam.

In some aspects, an apparatus includes a transceiver configured to: communicate, by a first wireless communication device with a second wireless communication device, a first communication signal using a first beam characteristic during a frame period; transmit, during the frame period, a feedback based on the first communication signal; and communicate, by the first wireless communication device with the second wireless communication device, a second communication signal using a second beam characteristic in response to the feedback. In some examples, the frame period includes a frame based equipment (FBE) frame period. In some examples, the feedback indicates a beam index identifying the second beam characteristic. In some examples, the first beam characteristic includes at least one of a peak gain of the first beam or a width of the first beam. In some examples, the second beam characteristic includes at least one of a peak gain of the second beam or a width of the second beam. In some cases, within the frame period a first beam having the first beam characteristic contains the second beam having the second beam characteristic. In some cases, the first beam having the first beam characteristic is a wider beam than the second beam having the second beam characteristic. In some cases, a first beam having the first beam characteristic and a second beam having the second beam characteristic are in different beam directions within a beam direction of a wider beam.

In some aspects, a computer-readable medium having program code recorded thereon, the program code including: code for causing a first wireless communication device to perform in a shared radio frequency band during a first portion of a frame period, a first listen-before-talk (LBT) using a first beam characteristic; code for causing the first wireless communication device to perform in the shared radio frequency band during a second portion of the frame period, a second LBT using a second set of beam characteristics different from the first beam characteristic; and code for causing the first wireless communication device to communicate with a second wireless communication device in the shared radio frequency band during the second portion of the frame period, one or more communication signals using the second set of beam characteristics.

In some examples, the code for causing the first wireless communication device to perform the first LBT includes code for causing the first wireless communication device to perform the first LBT using a first beam having the first beam characteristic, where the code for causing the first wireless communication device to perform a second LBT includes code for causing the first wireless communication device to perform the second LBT using a second set of beams having the second set of beam characteristics. In some cases, the first beam characteristic includes at least one of a peak gain of the first beam or a width of the first beam. In some cases, the second set of beam characteristics includes at least one of a peak gain of the beam of the second set of beams or a width of the beam of the second set of beams. In some cases, the second set of beams has a maximum number of beams determined based on the first beam characteristic.

In some examples, the program code further includes code for causing the first wireless communication device to transmit, by the first wireless communication device, a configuration for the second set of beams via at least one of radio resource control (RRC) message, a medium access control-control element (MAC-CE) message, or a downlink control information (DCI) message. In some examples, the program code further includes code for causing the first wireless communication device to perform, by the first wireless communication device in the shared radio frequency band during a third portion of the frame period, a third LBT using a third beam having the second set of beam characteristics. In some examples, the first beam contains the second set of beams within the frame period. In some examples, a duration of performing the first LBT is different from a duration of performing the second LBT. In some cases, the code for causing the first wireless communication device to perform the first LBT includes code for causing the first wireless communication device to perform the first LBT using a first energy detection threshold, where the code for causing the first wireless communication device to perform the second LBT includes code for causing the first wireless communication device to perform the second LBT using a second energy detection threshold different from the first energy detection threshold.

In some examples, the program code further includes: code for causing the first wireless communication device to communicate, by the first wireless communication device with the second wireless communication device in the shared radio frequency band during the first portion of the frame period, one or more communication signals using the first beam characteristic, where the code for causing the first wireless communication device to communicate one or more communication signals using the first beam characteristic includes code for causing the first wireless communication device to communicate one or more communication signals using a first transmit power, and where the code for causing the first wireless communication device to communicate one or more communication signals using the second set of beam characteristics includes code for causing the first wireless communication device to communicate one or more communication signals using a second transmit power different from the first transmit power.

In some examples, the first beam characteristic is based on a spatial direction associated with a synchronization signal block (SSB) beam. In some examples, the first beam characteristic is based on a spatial direction associated with a channel state information-reference signal (CSI-RS) beam. In some examples, the second set of beam characteristics is based on a spatial direction associated with a physical downlink control channel (PDCCH). In some examples, the second set of beam characteristics is based on a spatial direction associated with a physical downlink shared channel (PDSCH). In some examples, the second set of beam characteristics is based on a spatial direction associated with a CSI-RS beam. In some cases, the first portion is at a start of the frame period. In some cases, the first portion of the frame period precedes the second portion of the frame period. In some cases, a first beam having the first beam characteristic is a wider beam than each beam of a second set of beams having the second set of beam characteristics. In some examples, the second set of beams includes a first narrow beam and a second narrow beam in different beam directions within a beam direction of the wider beam. In some examples, the frame period includes a frame based equipment (FBE) frame period. In some cases, the frame period includes a plurality of FBE frame periods, where the first portion includes a first contention period of a first FBE frame period of the plurality of FBE frame periods, the second portion includes a second contention period of a second FBE frame period of the plurality of FBE frame periods, and the first FBE frame period precedes the second FBE frame period. In some examples, the code for causing the first wireless communication device to perform the first LBT includes code for causing the first wireless communication device to perform, by the first wireless communication device in the shared radio frequency band during the first contention period of the first FBE frame period, the first LBT using the first beam characteristic, where the code for causing the first wireless communication device to perform the second LBT includes code for causing the first wireless communication device to perform, by the first wireless communication device in the shared radio frequency band during the second contention period of the second FBE frame period, the second LBT using the second set of beam characteristics.

In some examples, the program code further includes: code for causing the first wireless communication device to perform, by the first wireless communication device in the shared radio frequency band during the first portion of the frame period, a first measurement using a reception beam having the first beam characteristic; and code for causing the first wireless communication device to determine, by the first wireless communication device, to switch from the first beam in the shared radio frequency band to a second beam having the second set of beam characteristics based on comparing the first measurement to a threshold, the first beam characteristic being different from the second set of beam characteristics. In some cases, the program code further includes code for causing the first wireless communication device to determine, by the first wireless communication device, to communicate the one or more communication signals using the second beam based on the switch from the first beam to the second beam.

In some cases, the program code further includes code for causing the first wireless communication device to receive, by the first wireless communication device from the second wireless communication device, a feedback indicating a second beam characteristic of the second set of beam characteristics; code for causing the first wireless communication device to determine, based on the feedback, to switch from a first beam having the first beam characteristic to a second beam having the second beam characteristic; and code for causing the first wireless communication device to determine, by the first wireless communication device, to communicate the one or more communication signals using the second beam based on the switch from the first beam to the second beam.

In some aspects, a computer-readable medium having program code recorded thereon, the program code including: code for causing a first wireless communication device to communicate with a second wireless communication device, a first communication signal using a first beam characteristic during a frame period; code for causing the first wireless communication device to transmit, during the frame period, a feedback based on the first communication signal; and code for causing the first wireless communication device to communicate with the second wireless communication device, a second communication signal using a second beam characteristic in response to the feedback. In some examples, the frame period includes a frame based equipment (FBE) frame period. In some cases, the feedback indicates a beam index identifying the second beam characteristic. In some cases, the first beam characteristic includes at least one of a shape of a first beam having the first beam characteristic, a peak gain of the first beam, or a width of the first beam. In some cases, the second beam characteristic includes at least one of a shape of a second beam having the second beam characteristic, a peak gain of the second beam, or a width of the second beam.

In some examples, within the frame period a first beam having the first beam characteristic contains the second beam having the second beam characteristic. In some examples, the first beam having the first beam characteristic is a wider beam than the second beam having the second beam characteristic. In some examples, a first beam having the first beam characteristic and a second beam having the second beam characteristic are in different beam directions within a beam direction of a wider beam.

In some aspects, an apparatus includes: means for performing, in a shared radio frequency band during a first portion of a frame period, a first listen-before-talk (LBT) using a first beam characteristic; means for performing, in the shared radio frequency band during a second portion of the frame period, a second LBT using a second set of beam characteristics different from the first beam characteristic; and means for communicating, with a second wireless communication device in the shared radio frequency band during the second portion of the frame period, one or more communication signals using the second set of beam characteristics.

In some aspects, an apparatus includes: means for communicating, with a second wireless communication device, a first communication signal using a first beam characteristic during a frame period; means for transmitting, during the frame period, a feedback based on the first communication signal; and means for communicating, with the second wireless communication device, a second communication signal using a second beam characteristic in response to the feedback.

Information and signals may be represented using any of a variety of different technologies and techniques. In some aspects, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. Due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (e.g., a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of wireless communication, comprising:
performing, by a first wireless communication device in a shared radio frequency band during a first portion of a frame period, a first listen-before-talk (LBT) using a first beam characteristic;
   performing, by the first wireless communication device in the shared radio frequency band during a second portion of the frame period, a second LBT using a second set of beam characteristics different from the first beam characteristic, wherein the performing the second LBT using the second set of beam characteristics is based on a determination that the first LBT resulted in a failure; and
   communicating, by the first wireless communication device with a second wireless communication device in the shared radio frequency band during the second portion of the frame period, one or more communication signals using the second set of beam characteristics and based on the second LBT;
   wherein the frame period includes a plurality of frame based equipment (FBE) frame periods, wherein the first portion includes a first contention period of a first FBE frame period of the plurality of FBE frame periods, the second portion includes a second contention period of a second FBE frame period of the plurality of FBE frame periods, and the first FBE frame period precedes the second FBE frame period, and wherein a duration of the first contention period is longer than a duration of the second contention period.

2. The method of claim 1, wherein the performing a second LBT is based on an LBT result of the first LBT.

3. The method of claim 1, wherein the performing a first LBT includes performing the first LBT using a first beam having the first beam characteristic, and wherein the performing a second LBT includes performing the second LBT using a second set of beams having the second set of beam characteristics.

4. The method of claim 3, wherein the first beam characteristic includes at least one of a peak gain of the first beam or a width of the first beam.

5. The method of claim 3, wherein the second set of beam characteristics includes at least one of a peak gain of a beam of the second set of beams or a width of the beam of the second set of beams, and wherein the second set of beams has a maximum number of beams determined based on the first beam characteristic.

6. The method of claim 3, further comprising:
   transmitting, by the first wireless communication device, a configuration for the second set of beams via at least one of radio resource control (RRC) message, a medium access control-control element (MAC-CE) message, or a downlink control information (DCI) message.

7. The method of claim 3, wherein the first beam contains the second set of beams within the frame period.

8. The method of claim 1, wherein a duration of performing the first LBT is different from a duration of performing the second LBT.

9. The method of claim 1, wherein the performing a first LBT includes performing the first LBT based on a first energy detection threshold, and wherein the performing a second LBT includes performing the second LBT based on a second energy detection threshold different from the first energy detection threshold.

10. The method of claim 1, further comprising:
    communicating, by the first wireless communication device with the second wireless communication device in the shared radio frequency band during the first portion of the frame period, one or more communication signals using the first beam characteristic,
    wherein the communicating one or more communication signals using the first beam characteristic includes communicating one or more communication signals using a first transmit power, and wherein the communicating one or more communication signals using the second set of beam characteristics includes communicating one or more communication signals using a second transmit power different from the first transmit power.

11. The method of claim 1, wherein the first beam characteristic is based on at least one of a spatial direction associated with a synchronization signal block (SSB) beam or a spatial direction associated with a channel state information-reference signal (CSI-RS) beam, and wherein the second set of beam characteristics is based on a spatial direction associated with at least one of a physical downlink control channel (PDCCH), a spatial direction associated with a physical downlink shared channel (PDSCH), or a spatial direction associated with a CSI-RS beam.

12. The method of claim 1, wherein the first portion is at a start of the frame period.

13. The method of claim 1, wherein a first beam having the first beam characteristic is a wider beam than each beam of a second set of beams having the second set of beam characteristics, and wherein the second set of beams includes a first narrow beam and a second narrow beam in different beam directions within a beam direction of the wider beam.

14. The method of claim 1, further comprising:
performing, by the first wireless communication device in the shared radio frequency band during the first portion of the frame period, a first measurement using a reception beam having the first beam characteristic;
determining, by the first wireless communication device, to switch from the first beam in the shared radio frequency band to a second beam having the second set of beam characteristics based on comparing the first measurement to a threshold, the first beam characteristic being different from the second set of beam characteristics; and
determining, by the first wireless communication device, to communicate the one or more communication signals using the second beam based on the switch from the first beam to the second beam.

15. The method of claim 1, comprising:
receiving, by the first wireless communication device from the second wireless communication device, a feedback indicating a second beam characteristic of the second set of beam characteristics;
determining, based on the feedback, to switch from a first beam having the first beam characteristic to a second beam having the second beam characteristic; and
determining, by the first wireless communication device, to communicate the one or more communication signals using the second beam based on the switch from the first beam to the second beam.

16. A method of wireless communication, comprising:
communicating, by a first wireless communication device with a second wireless communication device, a first communication signal using a first beam characteristic during a frame period;
transmitting, during the frame period, a feedback based on the first communication signal, wherein the feedback indicates a beam index associated with a second beam characteristic, wherein the first beam characteristic is associated with a wider beam shape than the second beam characteristic; and
communicating, by the first wireless communication device with the second wireless communication device, a second communication signal using the second beam characteristic in response to the feedback;
wherein the frame period includes a plurality of frame based equipment (FBE) frame periods, wherein the first portion includes a first contention period of a first FBE frame period of the plurality of FBE frame periods, the second portion includes a second contention period of a second FBE frame period of the plurality of FBE frame periods, and the first FBE frame period precedes the second FBE frame period, and wherein a duration of the first contention period is longer than a duration of the second contention period.

17. The method of claim 16, wherein the first beam characteristic includes at least one of a shape of a first beam having the first beam characteristic, a peak gain of the first beam, or a width of the first beam, and wherein the second beam characteristic includes at least one of a shape of a second beam having the second beam characteristic, a peak gain of the second beam, or a width of the second beam.

18. An apparatus, comprising:
a processor configured to:
perform, by a first wireless communication device in a shared radio frequency band during a first portion of a frame period, a first listen-before-talk (LBT) using a first beam characteristic; and
perform, by the first wireless communication device in the shared radio frequency band during a second portion of the frame period, a second LBT using a second set of beam characteristics different from the first beam characteristic, wherein the processor is configured to perform the second LBT using the second set of beam characteristics based on a determination that the first LBT resulted in a failure; and
a transceiver configured to: communicate, by the first wireless communication device with a second wireless communication device in the shared radio frequency band during the second portion of the frame period, one or more communication signals using the second set of beam characteristics;
wherein the frame period includes a plurality of frame based equipment (FBE) frame periods, wherein the first portion includes a first contention period of a first FBE frame period of the plurality of FBE frame periods, the second portion includes a second contention period of a second FBE frame period of the plurality of FBE frame periods, and the first FBE frame period precedes the second FBE frame period, and wherein a duration of the first contention period is longer than a duration of the second contention period.

19. The apparatus of claim 18, wherein the processor is configured to:
perform the first LBT using a first beam having the first beam characteristic, wherein the first beam characteristic includes at least one of a shape of the first beam, a peak gain of the first beam, or a width of the first beam; and
perform the second LBT using a second set of beams having the second set of beam characteristics, wherein the second set of beam characteristics includes at least one of a peak gain of a beam of the second set of beams or a width of the beam of the second set of beams, and wherein the second set of beams has a maximum number of beams determined based on the first beam characteristic.

20. The apparatus of claim 18, wherein a first beam having the first beam characteristic is a wider beam than each beam of a second set of beams having the second set of beam characteristics, and wherein the second set of beams includes a first narrow beam and a second narrow beam in different beam directions within a beam direction of the wider beam.

21. The apparatus of claim 18, wherein the processor is configured to:
perform, by the first wireless communication device in the shared radio frequency band during the first portion of the frame period, a first measurement using a reception beam having the first beam characteristic;
determine, by the first wireless communication device, to switch from the first beam in the shared radio frequency band to a second beam having the second set of beam characteristics based on comparing the first measurement to a threshold, wherein the first beam characteristic is different from the second set of beam characteristics; and
determine, by the first wireless communication device, to communicate the one or more communication signals using the second beam based on the switch from the first beam to the second beam.

22. The apparatus of claim 18, further comprising:
a transceiver configured to:
receive, by the first wireless communication device from the second wireless communication device, a feedback indicating a second beam characteristic of the second set of beam characteristics, wherein the processor is configured to:

determine, based on the feedback, to switch from a first beam having the first beam characteristic to a second beam having the second beam characteristic;

determine, by the first wireless communication device, to communicate the one or more communication signals using the second beam based on the switch from the first beam to the second beam.

23. An apparatus, comprising:

a transceiver configured to:

communicate, by a first wireless communication device with a second wireless communication device, a first communication signal using a first beam characteristic during a frame period;

transmit, during the frame period, a feedback based on the first communication signal, wherein the feedback indicates a beam index associated with a second beam characteristic, wherein the first beam characteristic is associated with a wider beam shape than the second beam characteristic; and communicate, by the first wireless communication device with the second wireless communication device, a second communication signal using the second beam characteristic in response to the feedback;

wherein the frame period includes a plurality of frame based equipment (FBE) frame periods, wherein the first portion includes a first contention period of a first FBE frame period of the plurality of FBE frame periods, the second portion includes a second contention period of a second FBE frame period of the plurality of FBE frame periods, and the first FBE frame period precedes the second FBE frame period, and wherein a duration of the first contention period is longer than a duration of the second contention period.

24. The apparatus of claim 23, wherein the first beam characteristic includes at least one of a peak gain of the first beam or a width of the first beam, and wherein the second beam characteristic includes at least one of a peak gain of the second beam or a width of the second beam.

* * * * *